United States Patent
Mitsutani

[19]
[11] Patent Number: 5,887,421
[45] Date of Patent: Mar. 30, 1999

[54] APPARATUS FOR DETECTING THE DETERIORATION OF A THREE-WAY CATALYTIC CONVERTER FOR AN INTERNAL COMBUSTION ENGINE

[75] Inventor: Noritake Mitsutani, Toyota, Japan

[73] Assignee: Toyota Jidosha Kabushiki Kaisha, Toyota, Japan

[21] Appl. No.: 815,704

[22] Filed: Mar. 12, 1997

[30] Foreign Application Priority Data

Mar. 18, 1996 [JP] Japan .................................. 8-060933
Aug. 12, 1996 [JP] Japan .................................. 8-212702

[51] Int. Cl.⁶ ............................................... F01N 3/00
[52] U.S. Cl. ................ 60/274; 60/276; 60/277; 73/118.1
[58] Field of Search ................ 60/274, 276, 277; 73/118.1

[56] References Cited

U.S. PATENT DOCUMENTS

| | | |
|---|---|---|
| 5,279,116 | 1/1994 | Shimizu et al. . |
| 5,301,501 | 4/1994 | Shimizu et al. . |
| 5,303,548 | 4/1994 | Shimizu et al. . |
| 5,359,853 | 11/1994 | Shimizu . |
| 5,363,647 | 11/1994 | Ohuchi et al. . |
| 5,377,484 | 1/1995 | Shimizu .................................. 60/277 |
| 5,412,941 | 5/1995 | Suzuki et al. . |
| 5,417,058 | 5/1995 | Shimizu . |
| 5,724,809 | 3/1998 | Mitsutani et al. ................ 60/276 |
| 5,737,916 | 4/1998 | Mitsutani .......................... 60/276 |
| 5,743,086 | 4/1998 | Nagai .................................. 60/277 |

FOREIGN PATENT DOCUMENTS

| | | |
|---|---|---|
| A 0-536789 | 4/1993 | European Pat. Off. . |
| A 0-588123 | 3/1994 | European Pat. Off. . |
| A 5-98948 | 4/1993 | Japan . |

*Primary Examiner*—Thomas E. Denion
*Attorney, Agent, or Firm*—Oliff & Berridge, PLC

[57] ABSTRACT

The object of the present invention is to provide an apparatus for detecting the deterioration of a three-way catalytic converter which can accurately detect the deterioration degree. The present apparatus is furnished with an upstream A/F sensor installed at the upstream side of the converter and a downstream A/F sensor installed at the downstream side of the converter. The output of the upstream sensor is converted into the converted output for calculating the trajectory length. The trajectory length of the converted output and that of the output of the downstream sensor are respectively calculated, and the deterioration degree of the converter is detected based on these two trajectory lengths to avoid the misjudgment. The detecting accuracy can be better improved by compensating for the aberration of the balance between the oxygen absorbing power and the oxygen releasing power of the converter.

12 Claims, 25 Drawing Sheets

Fig.3
| No. | VAF | VOS WHEN THE CONVERTER IS NORMAL | VOS WHEN THE CONVERTER IS DETERIORATED | DETECTION |
|---|---|---|---|---|
| 1 |  MINIMUM |  TL:MINIMUM TR:1.0 |  TL:MINIMUM TR:1.0 | × |
| 2 |  SMALL |  TL:MINIMUM TR:0.5 |  TL:MEDIUM TR:2.0 | ○ |
| 3 |  MEDIUM |  TL:SHORT TR:0.2 | 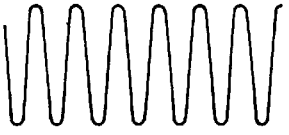 TL:LONG TR:1.5 | ○ |
| 4 | 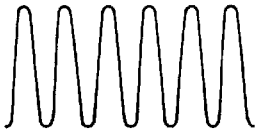 LARGE |  TL:MEDIUM TR:0.4 | 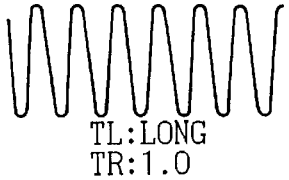 TL:LONG TR:1.0 | ○ |
| 5 | 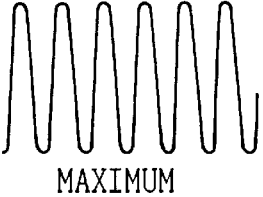 MAXIMUM | 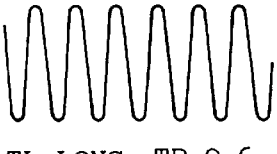 TL:LONG TR:0.6 | 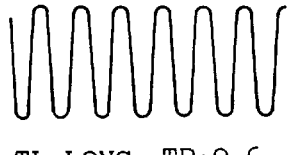 TL:LONG TR:0.6 | × |
TL:TRAJECTORY LENGTH
TR:TRAJECTORY LENGTH RATIO

|  | n | ------ | 2 | 1 | PRESENT |
|---|---|---|---|---|---|
| ESTIMATED AMOUNT OF AIR | $MC_n$ | ------ | $MC_2$ | $MC_1$ | $MC_0$ |
| TARGET AMOUNT OF FUEL | $FCR_n$ | ------ | $FCR_2$ | $FCR_1$ | $FCR_0$ |

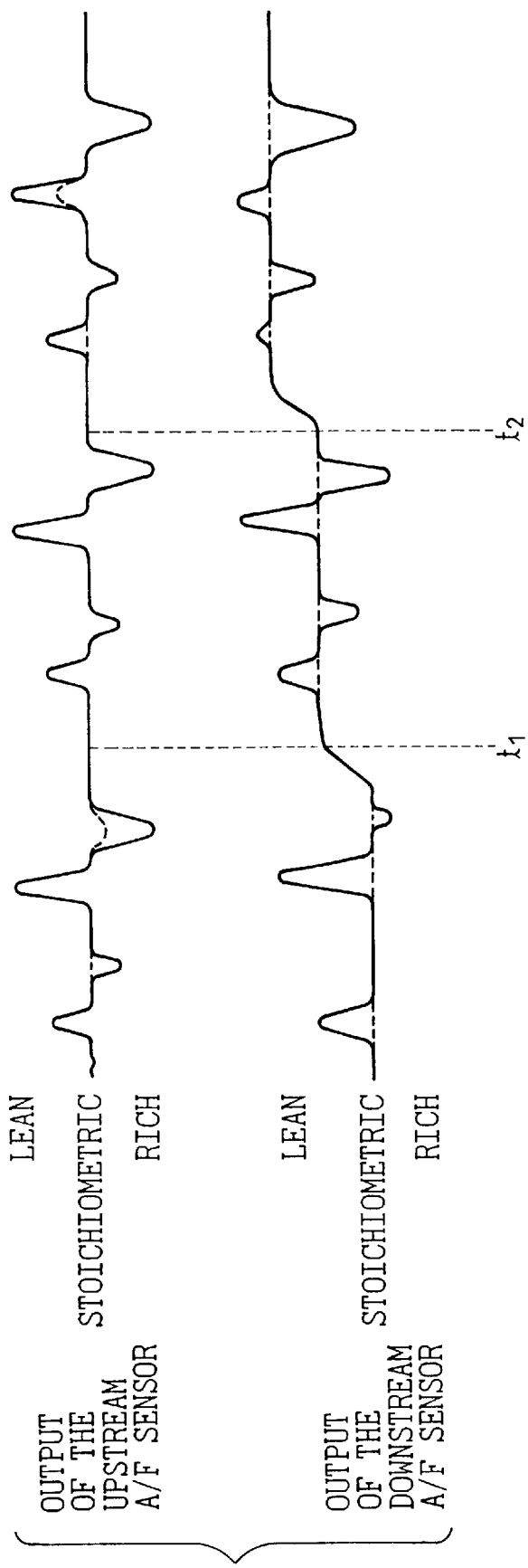

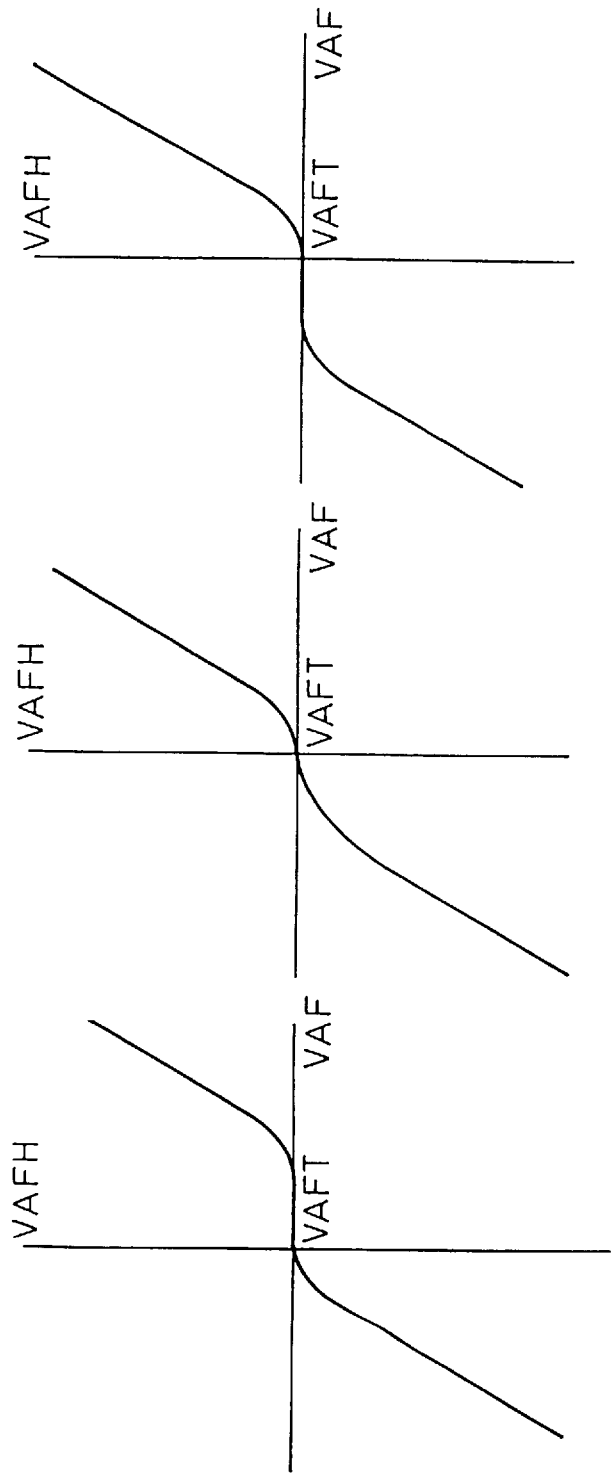

APPARATUS FOR DETECTING THE DETERIORATION OF A THREE-WAY CATALYTIC CONVERTER FOR AN INTERNAL COMBUSTION ENGINE

BACKGROUND OF THE INVENTION

1. Field of the Invention

This invention relates to an apparatus for detecting the deterioration of a three-way catalytic converter for an internal combustion engine, and especially relates to an apparatus for detecting the deterioration of the converter enabled to improve a detecting accuracy.

2. Description of the Related Art

In order to purify the exhaust gas exhausted from an internal combustion engine for an automobile, it is general practice to apply a three-way catalytic converter which oxidizes unburned combustibles (HC, CO) and simultaneously deoxidizes nitrogen oxides ($NO_x$). It is necessary to control and air-fuel ratio (A/F) of the mixture supplied to the engine at the stoichiometric air-fuel ratio to maintain the oxidizing power and the deoxidizing power of the three-way catalytic converter. Therefore, a fuel injection control system for the engine uses an $O_2$ sensor (an oxygen density sensor) [See FIG. 1] which determines whether or not the air-fuel ratio of the mixture is larger than the stoichiometric air-fuel ratio, and feeds back the output of the $O_2$ sensor in order to control the quantity of injected fuel.

In this air-fuel ratio feedback control system, the $O_2$ sensor is mounted close to a combustion chamber, that is, at the upstream side of the converter, but the output of the $O_2$ sensor may fluctuate due to the heat radiated from the engine. In order to compensate for this fluctuation, a double $O_2$ sensor control system which has one more $O_2$ sensor mounted at the downstream side of the converter has been proposed. The output of the downstream $O_2$ sensor changes more moderately than that of the upstream $O_2$ sensor and the downstream $O_2$ sensor can detect an air-fuel ratio of the whole mixture because the exhaust gas at the downstream side of the converter is sufficiently mixed and its oxygen density is almost at equilibrium condition. The double $O_2$ sensor control system has not only a main air fuel ratio feedback control subsystem using the output of the upstream $O_2$ sensor, but also an auxiliary air-fuel ratio feedback control subsystem using the output of the downstream $O_2$ sensor. This aims at compensating for the output of the downstream $O_2$ sensor and an improvement of the control accuracy of the air-fuel ratio control system by correcting the air-fuel ratio correction factor used in the main air fuel ratio feedback control subsystem in accordance with the output of the downstream $O_2$ sensor.

Sufficient purification of the exhaust gas, however, cannot be accomplished even by the above-mentioned accurate air-fuel ratio control when the converter has been deteriorated by the heat radiated from the exhaust gas or lead contained in the exhaust gas. Therefore, various kind of apparatuses for detecting the deterioration of the converter have been proposed. One type of these apparatuses detects the deterioration by detecting a decline of the $O_2$ storage ability of the converter (the ability to store the excessive oxygen in the converter when the exhaust gas is lean and release the stored oxygen for purifying the exhaust gas when the exhaust gas is rich) by using the downstream $O_2$ sensor. That is, as the deterioration of the converter causes the fall of the $O_2$ storage ability of the converter, this type apparatus detects the deterioration of the converter by detecting the fall of the $O_2$ storage ability shown by a trajectory length (that is, the length of the response curve of the sensor) and/or an inverting frequency of the output of the downstream $O_2$ sensor. For example, the apparatus disclosed in the Unexamined Patent Publication No. 5-98948 detects the deterioration of the converter by measuring lengths of the response curves the outputs of the upstream $O_2$ sensor and the downstream $O_2$ sensor, and calculating the ratio between these two lengths.

Recently, an engine control system which controls an air-fuel ratio so that a purification power of the converter can be always maintained at a high level has been developed. That is, the $O_2$ storage ability means a power for purifying the exhaust gas by storing excessive oxygen when the exhaust gas is lean, and by releasing the stored oxygen when the exhaust gas is rich, but this power is limited. Therefore, it is necessary to keep an amount of oxygen stored in the converter at a fixed amount (for example, a half of the maximum amount) in order to provide for the air-fuel ratio fluctuating from the rich state to the lean state and vice versa. If the amount of the stored oxygen is kept at the fixed amount, it is possible to store oxygen in the converter or release it from the converter, and to maintain the oxidizing power and deoxidizing power of the converter at a high level.

In the above-mentioned engine control system, an air-fuel ratio sensor which can linearly detect the air-fuel ratio (A/F sensor) [See FIG. 2] is used as the upstream sensor, and a proportional plus integral feedback control scheme (PI control scheme) is applied. That is, an injected fuel amount is calculated using a following equation.

Revised fuel amount=$K_p$×(Present fuel error)+$K_s$×υ(Previous fuel error)

Where,
Fuel error=Fuel amount actually burned in a cylinder−Fuel amount required to keep a stoichiometric air-fuel ratio Fuel amount actually burned in a cylinder=Actual air flow/Actual air-fuel ratio $K_p$=Proportional gain $K_s$=Integral gain As shown in the above equation, the proportional term functions so as to control the actual air-fuel ratio at the stoichiometric air-fuel ratio similarly when the actual air-fuel ratio is controlled in accordance with the output of the $O_2$ sensor, and the integral term functions so as to cancel the offset. That is, the amount of the stored oxygen can be maintained at a fixed amount by this integral term. For example, if the lean exhaust gas is supplied due to a sudden speed up, the oxygen in the exhaust gas is stored in the converter to compensate for the lean state of the exhaust gas.

For the above-mentioned $O_2$ storage amount control system, an $O_2$ sensor mounted at the downstream side of the converter can be also applied in order to compensate for the fluctuation of the upstream A/F sensor. Therefore, the deterioration of the converter can be detected by detecting the fall of the $O_2$ storage effect using the downstream $O_2$ sensor.

By the way, the output of the downstream $O_2$ sensor is influenced by the fluctuation of the air-fuel ratio of the exhaust gas supplied to the converter even when the converter is not deteriorated. That is because the output of the downstream $O_2$ sensor is influenced by the fluctuation of the air-fuel ratio of the exhaust gas exhausted from the converter which depends upon that of the exhaust gas supplied to the converter. Therefore, a misjudgement of the deterioration of the converter may be caused due to the fluctuation of the air-fuel ratio of the exhaust gas supplied to the converter when the deterioration of the converter is detected in accordance with the output of the downstream sensor. The reason why the misjudgement is caused will be explained referring to the accompanying drawings.

FIG. 3 shows various outputs of the downstream $O_2$ sensor, which correspond to minimum, small, medium, large, and maximum fluctuations of the air-fuel ratio of the exhaust gas supplied to the converter (that is, the output of the upstream A/F sensor VAF), not only when the converter is normal, but also when it is deteriorated.

1. In the case of the minimum fluctuation of the output of the upstream sensor VAF In this case, the length of the response curve of the upstream A/F sensor LVAF becomes minimum. The fluctuation of the output of the downstream sensor VOS and the length of its response curve LVOS also become minimum, not only when the converter is normal, but also when it is deteriorated. Therefore, the ratio of these lengths, that is, the ratio of LVAF to LVOS, becomes about 1.0 whether or not the converter is normal. In this case, the condition of the converter cannot be detected by the ratio of the these lengths.

2. In the case of the small fluctuation

The length ratio becomes about 0.5 when the converter is normal, because the length of the response curve of the downstream sensor LVOS is kept minimum, though LVAF increases from minimum to short.

But the length ratio becomes 2.0 when the converter is deteriorated, because LVOS becomes medium as the $O_2$ storage ability does not function. In this case, the condition of the converter can be detected by the ratio of the lengths.

3. In the case of the medium LVAF

The length ratio becomes about 0.2 when the converter is normal, because LVOS is kept short due to the $O_2$ storage ability, though LVAF increases to medium.

However, the length ratio becomes 1.5 when the converter is deteriorated, because LVOS becomes long due to the Z shape-output characteristics of the $O_2$ sensor.

In this case, the condition of the converter can be detected by the ratio of the lengths.

4. In the case of the large LVAF

The length ratio becomes about 0.4 when the converter is normal, because LVOS is kept medium due to the $O_2$ storage effect.

However, the length ratio becomes 1.0 when the converter is deteriorated, because LVOS becomes long due to the Z shape-output characteristics of the $O_2$ sensor.

In this case, the condition of the converter can be detected by the ratio of the lengths.

5. In the case of the maximum LVAF

The length ratio becomes about 0.6 when the converter is normal, because LVOS becomes large due to the Z shape-output characteristics of the $O_2$ sensor whether or not the converter is normal. In this case, the condition of the converter cannot be detected by the ratio of the lengths.

Therefore, the detection of the deterioration of the converter must be inhibited when LVAF, that is, the length of the response curve of the output of the upstream A/F sensor is minimum or maximum if the deterioration is detected based on the lengths or the length ratio. Therefore, when the deterioration is detected by monitoring the outputs of the both sensors and calculating their lengths for a predetermined fixed monitoring period, it is possible to prevent the misjudgement by detecting the deterioration only when LVAF is between a predetermined fixed upper limit and a predetermined fixed lower limit.

Though this method is effective when VAF has a constant amplitude as shown FIG. 3, this method may cause misjudgement under a specific worst-case condition. Namely, when the air-fuel ratio feedback control system using the output of the A/F sensor is applied, the amplitude of the output of the A/F sensor may vary in accordance with various running conditions, because the air-fuel ratio is controlled so that the correction factor is increased proportional to the difference between the output of the sensor and the target voltage (corresponding to the stoichiometric air-fuel ratio). Therefore, the air-fuel ratio is kept constant while the automobile is running at constant speed, but it fluctuates when the speed is transiently changed.

For example, FIG. 4 shows a case where the air-fuel ratio is suddenly fluctuated for a monitoring period. The monitoring period is divided into two parts, that is, one is a period where the amplitude of VAF becomes maximum, and another is a period where that is kept at minimum as shown FIG. 4(A). In this case, VOS shows the same shape whether or not the converter is normal (See FIG. 4(B)), because VOS is kept minimum when VAF is minimum and VOS becomes large when VAF is maximum. The detection of the deterioration, however, is carried out because the length of the response curve of the A/F sensor LVAF for the monitoring period becomes longer than the predetermined lower limit. A misjudgement that the converter is normal after it has been actually deteriorated may be caused because LVOS for the monitoring period is kept short.

FIG. 5 shows a case where the running condition changes from the condition with large fluctuations of the air-fuel ratio to a normal condition for a monitoring period. The monitoring period is also divided into two parts, that is, one is a period where the amplitude of VAF becomes maximum, and another is a period where that is kept at minimum as shown FIG. 5(A). In this case, VOS also shows the same shape whether or not the converter is normal (See FIG. 5(B)). The detection of the deterioration, however, is carried out because the length of the response curve of the A/F sensor LVAF is averaged for the monitoring period and becomes shorter than the predetermined upper limit. The misjudgement that the converter is deteriorated even when it is actually kept normal, may be caused because the LVOS for monitoring period becomes long.

Furthermore, the accuracy for detecting the deterioration may become worse if the balance between the power for storing oxygen and the power for releasing oxygen is lost, because the amplitude of the downstream $O_2$ sensor is influenced by this balance even when the air-fuel ratio of the exhaust gas supplied to the converter is kept constant.

FIG. 6 is a graph to explain the above-mentioned problem, where (A) shows the output of the upstream A/F sensor and (B) shows the output of the downstream $O_2$ sensor. In this graph, the output of the $O_2$ sensor is kept at the rich state before time $t_3$, and turns from the rich state to the lean state at time $t_3$.

When the air-fuel ratio of the exhaust gas supplied to the converter deviates largely to the lean state at time $t_1$, the length of the response curve of the output of the $O_2$ sensor becomes long because the output of the $O_2$ sensor also deviates largely to the lean state from the rich state.

Conversely, when the air-fuel ratio of the exhaust gas supplied to the converter deviates largely to the rich state at time $t_2$, the length of the response curve of the $O_2$ sensor is not largely influenced by this deviation because the output of the $O_2$ sensor becomes saturated.

Similarly, when the air-fuel ratio of the exhaust gas supplied to the converter deviates largely to the lean state at time $t_4$, the length of the response curve of the $O_2$ sensor is not largely influenced by this deviation because the output of the $O_2$ sensor becomes saturated.

Conversely, when the air-fuel ratio of the exhaust gas supplied to the converter deviates largely to the rich state at time $t_5$, the length of the response curve of the $O_2$ sensor becomes long because the output of the $O_2$ sensor also deviates largely to the rich state from the lean state.

That is, the accuracy for detecting the deterioration of the converter may become worst because the deviation of the $O_2$ sensor is affected by the fluctuation of the air-fuel ratio of the exhaust gas exhausted from the converter, even when the fluctuation of the exhaust gas supplied to the converter is kept constant.

Note, the same problem may be caused if the downstream sensor is an A/F sensor.

SUMMARY OF THE INVENTION

Accordingly, the first object of the invention is to provide an apparatus for detecting the deterioration of a three-way catalytic converter which can accurately detect the deterioration of the converter for an engine in accordance with the output of the upstream air-fuel ratio sensor and the output of the downstream air-fuel ratio sensor, wherein the engine is controlled by feeding back the output of the upstream air-fuel sensor installed at the upstream side of the converter.

According to one aspect of the invention, there is provided an apparatus for detecting deterioration of a three-way catalytic converter disposed in an exhaust passage of an internal combustion engine comprising: an upstream air-fuel ratio sensor disposed in the exhaust passage at the upstream side of said catalytic converter for outputting a signal substantially proportional to the air-fuel ratio of the exhaust gas at the upstream side of said catalytic converter; a downstream air-fuel sensor disposed in the exhaust passage at the downstream side of said catalytic converter for outputting a signal corresponding to the air-fuel ratio of the exhaust gas at the downstream side of said catalytic converter; an air-fuel ratio feedback control means for controlling the air-fuel ratio of the engine to a target air-fuel ratio in accordance with at least the output of said upstream air-fuel ratio sensor; an output converting means for converting the output of said upstream air-fuel ratio sensor into the converted output in accordance with a relationship between the difference between the output of said upstream air-fuel ratio sensor and the target air-fuel ratio and the difference between the output of said downstream air-fuel sensor and the target air-fuel ratio; a length calculating means for calculating a length of the response curve of the converted output of said upstream air-fuel ratio sensor converted by said output converting means and a length of the response curve of said downstream air-fuel ratio sensor when the engine is controlled by said air-fuel ratio feedback control means; and a deterioration detecting means for detecting a deterioration of said catalytic converter in accordance with the upstream length and the downstream length calculated by said length calculating means.

The second object of the invention is to provide an apparatus for detecting the deterioration of the converter which can prevent the detecting accuracy from becoming worse due to the fluctuation of the balance between the absorbing power and the releasing power.

According to another aspect of the invention, there is provided an apparatus for detecting deterioration of a three-way catalytic converter disposed in an exhaust passage of an internal combustion engine comprising: an upstream air-fuel ratio sensor disposed in the exhaust passage at the upstream side of said catalytic converter for outputting a signal substantially proportional to the air-fuel ratio of the exhaust gas at the upstream side of said catalytic converter; a downstream air-fuel sensor disposed in the exhaust passage at the downstream side of said catalytic converter for outputting a signal corresponding to the air-fuel ratio of the exhaust gas at the downstream side of said catalytic converter; an air-fuel ratio feedback control means for controlling the air-fuel ratio of the engine to a target air-fuel ratio in accordance with at least the output of said upstream air-fuel ratio sensor; an air-fuel ratio center estimating means for estimating a center of the air-fuel ratio of said catalytic converter; an output converting means for converting the output of said upstream air-fuel ratio sensor into the converted output in accordance with a relationship between the difference between the output of said upstream air-fuel ratio sensor and the target air-fuel ratio and the center estimated by said air-fuel ratio center estimating means; a length calculating means for calculating a length of the response curve of the converted output of said upstream air-fuel ratio sensor converted by said output converting means and a length of the response curve of said downstream air-fuel ratio sensor when the engine is controlled by said air-fuel ratio feedback control means; and a deterioration detecting means for detecting a deterioration degree of said catalytic converter in accordance with the upstream length and the downstream length calculated by said length calculating means.

BRIEF DESCRIPTION OF THE DRAWINGS

FIG. 3 is a table to show how the output of the downstream $O_2$ sensor VOS is affected by the air-fuel ratio of the exhaust gas supplied to the converter;

FIG. 28 is a timing chart when A/F sensors are applied for both an upstream sensor and a downstream sensor; and FIGS. 29(A), (B), and (C) is a second converting map.

DETAILED DESCRIPTION OF THE PREFERRED EMBODIMENTS

Figure 1:
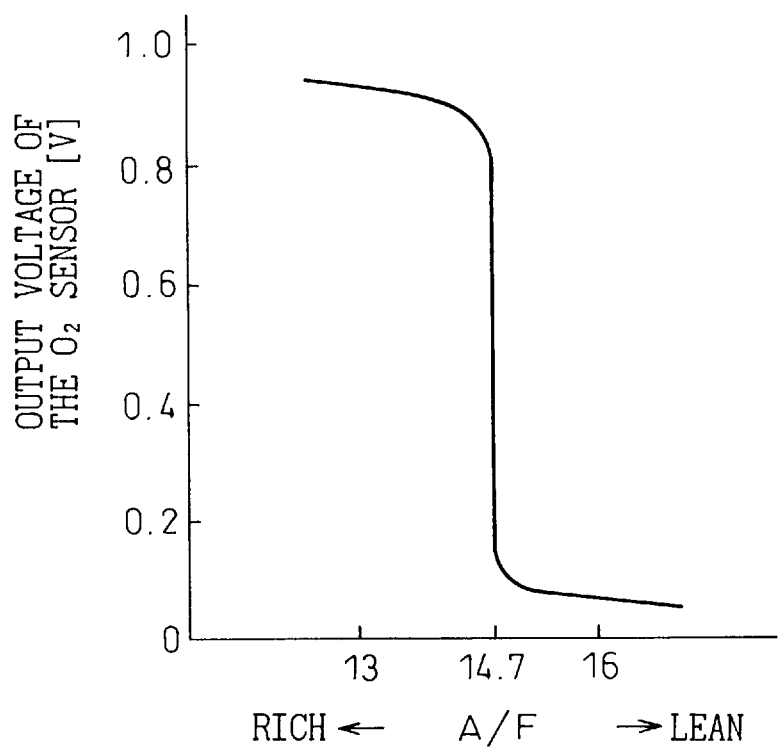
FIG. 1 is a graph to show a relationship between the air-fuel ratio and the output of an $O_2$ sensor.
Figure 2:
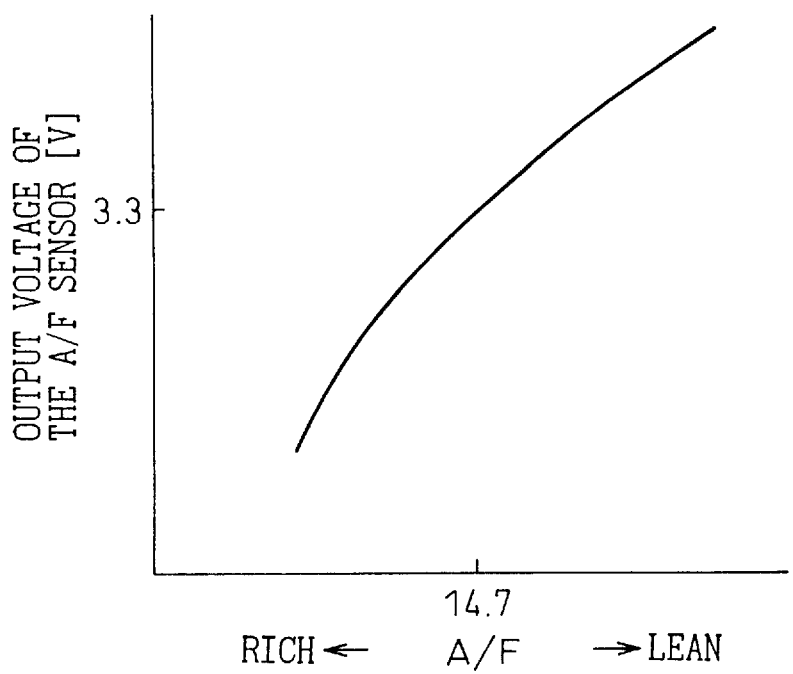
FIG. 2 is a graph to show a relationship between the air-fuel ratio and the output of an A/F sensor.
Figure 4:
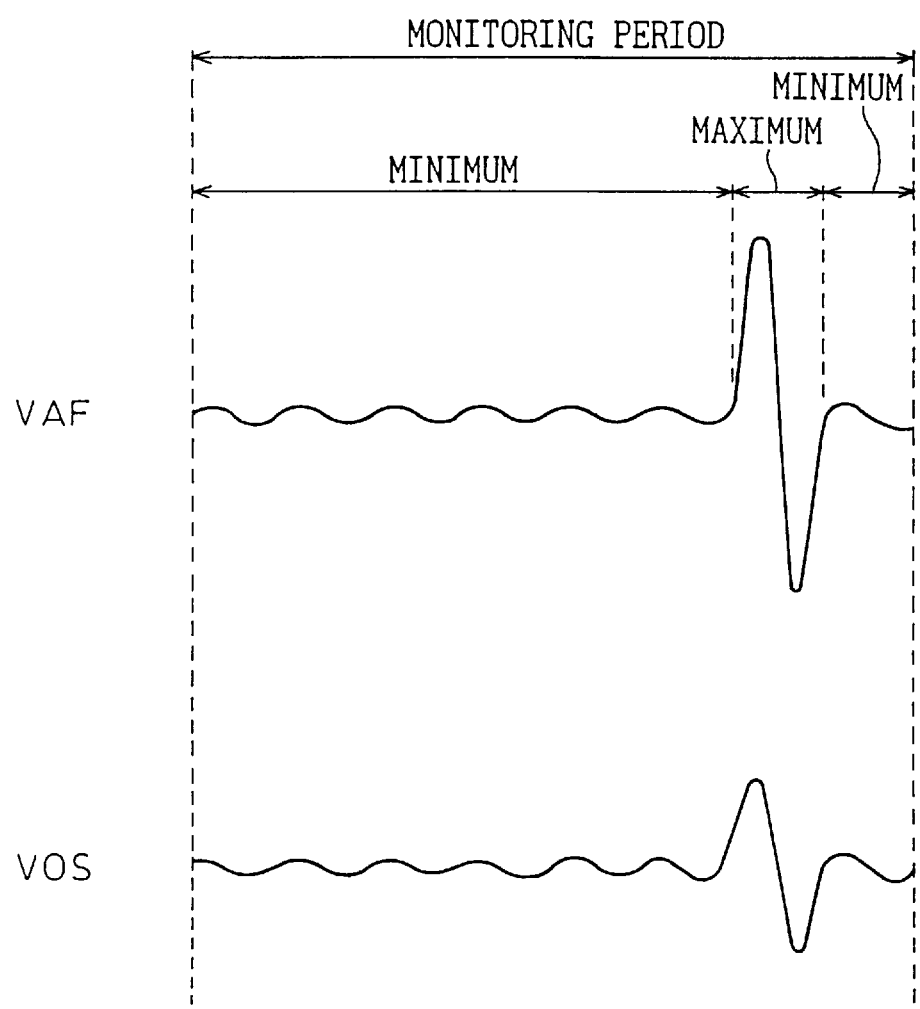
FIG. 4 is a timing chart to show VAF (A), that is, the output of the upstream A/F sensor and VOS (B), that is, the output of the downstream $O_2$ sensor when the sudden fluctuation of the air-fuel ratio happens for the monitoring period.
Figure 5:
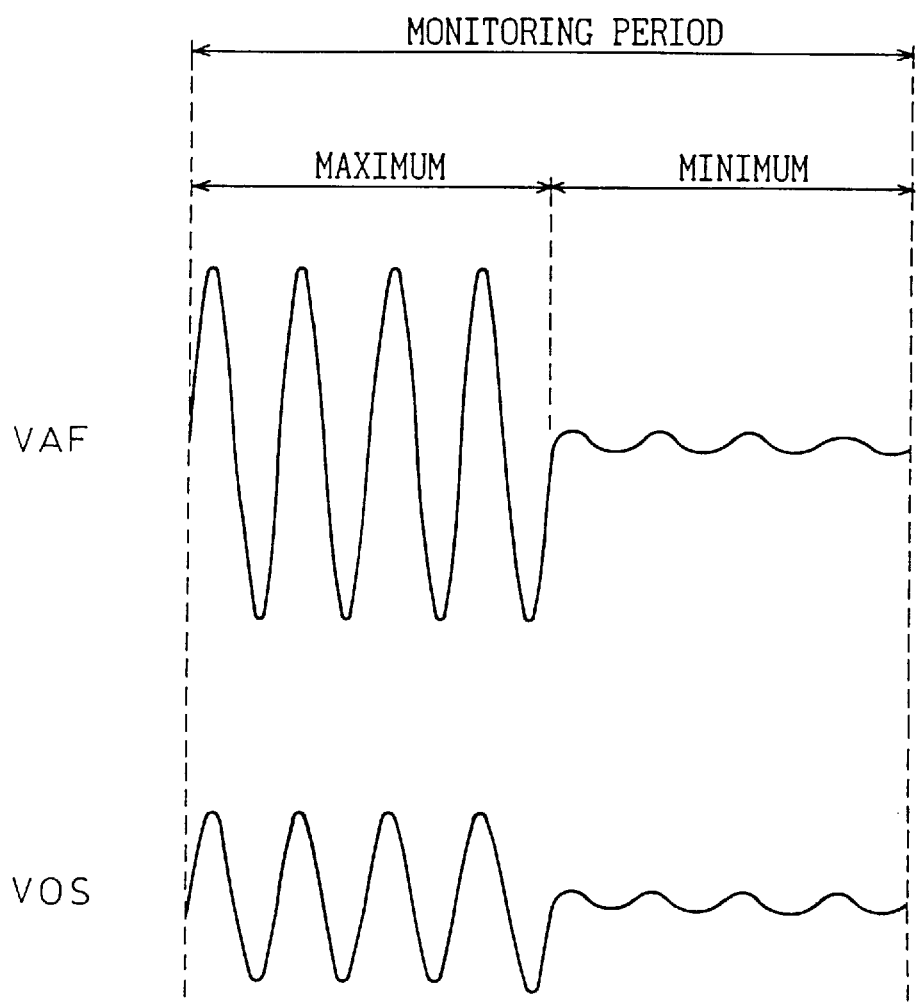
FIG. 5 is a timing chart to show VAP (A), that is, the output of the upstream A/F sensor and VOS (B), that is, the output of the downstream $O_2$ sensor when the operating condition changes from the condition with the large fluctuation of the air-fuel ratio to the condition with small fluctuation.
Figure 6:
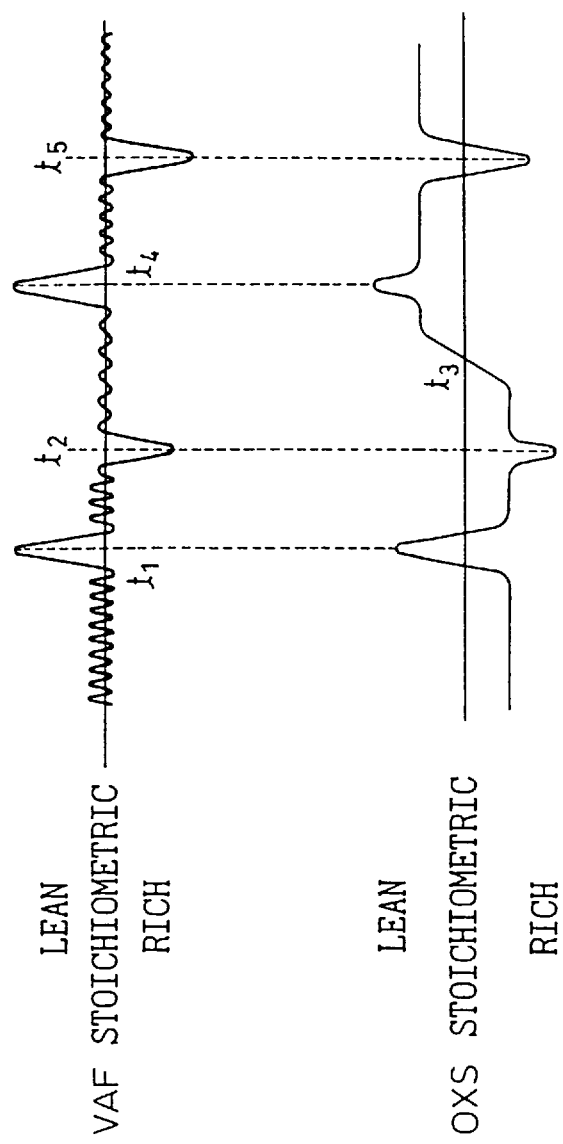
FIG. 6 is a graph to show the problem to be solved by the present invention.
Figure 7:
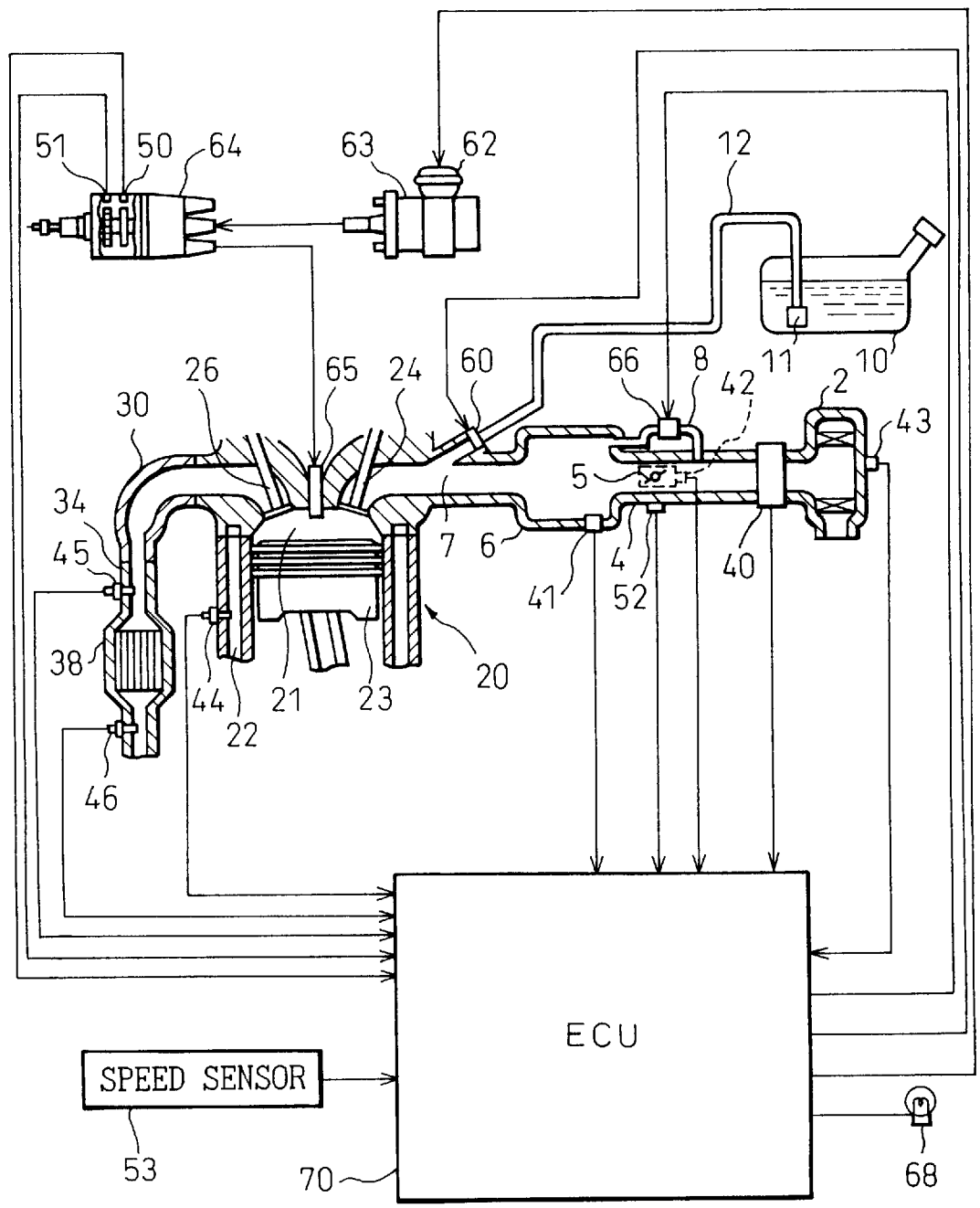
FIG. 7 is a block diagram to show an embodiment of an apparatus for detecting the deterioration of the converter according to the invention.

FIG. 7 is a block diagram of an electrically controlled engine having an apparatus for detecting the deterioration of the converter according to the present invention. Air required for burning fuel in a cylinder of an internal combustion engine is filtered with an air cleaner 2, and is distributed to each intake pipe 7 corresponding to each cylinder through a throttle body 4 and a surge tank (an intake manifold) 6. Note, an intake air flow rate is controlled by a throttle valve 5 installed in the throttle body 4, and an intake air temperature is detected by an intake air temperature sensor 43. Further, an intake pressure is detected by a vacuum sensor 41.

An opening of the throttle valve 5 is detected by a throttle valve opening sensor 42. When the throttle valve 5 is fully closed, an idling switch turns ON and a throttle valve full close signal becomes active. An idling speed control valve (ISCV) 66 is arranged on a bypass which bypasses the throttle valve 5 to control an air flow rate when the engine is idling.

Fuel stored in a fuel tank 10 is pumped up by a fuel pump 11, and is injected from an injection valve 60 into the intake pipe 7 through a fuel pipe 12.

Injected fuel and intake air are mixed in the intake pipe 7, and mixture is supplied to a combustion chamber 21 of a cylinder 20 through an intake valve 24. The supplied mixture is compressed by a piston 23, and is ignited to generate power. The mixture is ignited when an igniter 62 receives an ignition control signal to control a primary current, and the caused secondary current is supplied to a spark plug 65 through a distributor 64.

Note, a reference position sensor 50 which generates a reference position signal every a predetermined fixed cam angle, for example 720° CA, and a crank angle sensor 51 which generates a crank angle signal every 30° CA are installed in the distributor 64. An actual speed is detected by a speed sensor 53 which generates a pulse signal, the frequency thereof being proportional to an automobile speed. The cylinder 20 is cooled by coolant supplied to a coolant channel 22, and the temperature of the coolant is detected by a coolant temperature sensor 44.

The burned mixture, that is, an exhaust gas is exhausted to an exhaust pipe 34 through an exhaust valve 26 and an exhaust manifold 30. In the exhaust pipe, an upstream A/F sensor 45 which linearly detects an air-fuel ratio in accordance with an oxygen density of the exhaust gas is installed. At the downstream side of the A/F sensor 45, a three-way catalytic converter which oxidizes unburned combustibles (HC, CO) and simultaneously deoxidizes nitrogen oxide ($NO_x$) is arranged. The exhaust gas purified by the converter is discharged into the air.

The engine has an auxiliary air-fuel ratio feedback control subsystem to compensate for a fluctuation of the A/F sensor 45 by shifting the center of the fluctuation range of the main air-fuel ratio feedback control signal in accordance with the A/F sensor 45, and a downstream $O_2$ sensor (or a downstream A/F sensor) 46 is arranged at the downstream side of the converter 38 for this purpose.

Figure 8:
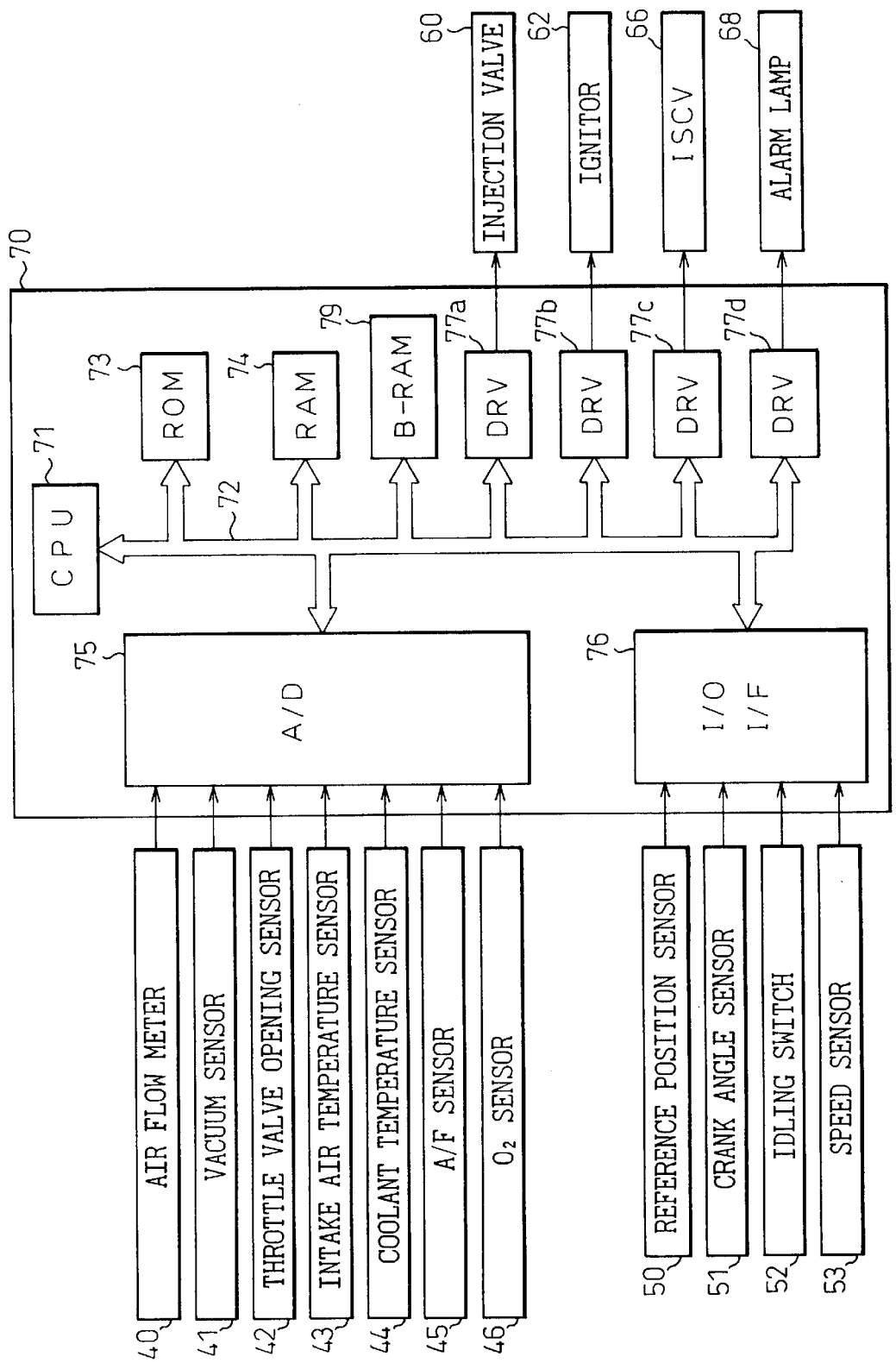
FIG. 8 is a block diagram of ECU (Engine Control Unit)

An engine control unit (ECU) 70 is a micro-computer system which not only executes a fuel-injection control (an air-fuel ratio control), an ignition timing control and an idling speed control, but also detects a deterioration of the converter, and its construction is shown in FIG. 8. A central processing unit (CPU) 71 inputs signals generated from sensors and switches through an A/D converter circuit 75 or an input interface circuit 76 in accordance with programs and maps stored in a read only memory (ROM) 73, executes control calculation in accordance with the input signals, and outputs control signals for actuators based on the control calculation through output interfaces 77a–77d. A random access memory (RAM) 73 is used for temporarily storing data. A back-up RAM 79 is powered directly by a battery (not shown), and is used for storing data (for example, various learned values) which must be kept when an ignition switch is turned off. These components in the ECU are connected each other by a system bus 72 composed of an address bus, a data bus and a control bus.

The control calculation executed in the ECU 70 having the above-mentioned structure is explained as follows.

The ignition control system controls an ignition timing in accordance with not only the engine speed detected by the crank angle sensor 51 but also signals detected by other sensors, and outputs an ignition to the igniter 62 through a drive circuit 77b.

The idling speed control system keeps an optimal idling speed by controlling an air flow rate in accordance with the speed signal generated from the speed sensor 53 when an idling state is generated from the idling switch 52. This system calculates a control signal to maintain an engine speed at a fixed target speed by comparing an actual speed with the target speed in accordance with the coolant temperature detected by the water temperature sensor 44, and operates ISCV 66 through a driving circuit 77c.

Hereafter, the air-fuel ratio control system and the detecting system for detecting the converter deterioration will be explained referring to the related flowcharts.

Figures 9, 10:
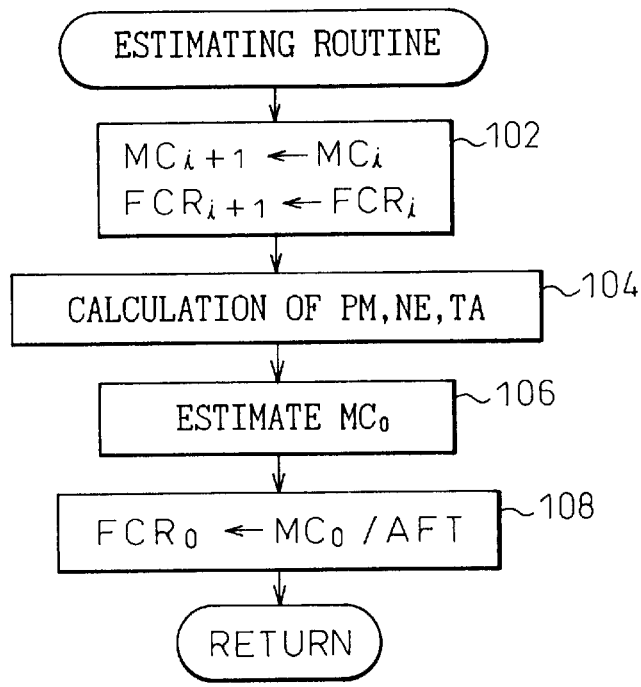
FIG. 9 is a flowchart of an estimating routine.
FIG. 10 is a table to show an allocation of data stored in RAM.

FIG. 9 is a flow chart of an estimating routine for estimating an amount of air and an amount of fuel in the cylinder. This routine is executed every fixed crank angle. At first, the amount of air in the cylinder MCi and the amount of fuel in the cylinder FCRi which have obtained in the previous execution of this routine is stored. That is, MCi and FCRi are respectively replaced with MCi+1 and FCRi+1 (step 102). This is to stored MCi and FCRi calculated at the previous n-th execution in RAM 74, and to calculate a new $MC_0$ and a new $FCR_0$.

Next, the present intake pipe pressure PM, the engine speed NE and the throttle valve opening TA is calculated in accordance with the output signals generated from the vacuum sensor 41, the crank angle sensor 51 and the throttle valve opening sensor 42 (step 104). The amount of air supplied to the cylinder $MC_0$ is estimated in accordance with PM, NE and TA (step 106). Note, the amount of air in the cylinder can generally be estimated in accordance with the intake pipe pressure PM and the engine speed NE, but in this embodiment, the throttle valve opening TA is also used to increase the estimating accuracy in the transient condition.

A target amount of fuel supplied to the cylinder $FCR_0$ is calculated using the following equation in order to control the air-fuel ratio of the mixture at the stoichiometric air-fuel ratio AFT (step 108).

$FCR_0 \leftarrow MC_0/AFT$

The estimated amount of air supplied to the cylinder $MC_0$ and the estimated amount of fuel supplied to the cylinder $FCR_0$ are stored in RAM 74 as shown in FIG. 10.

Figure 11:
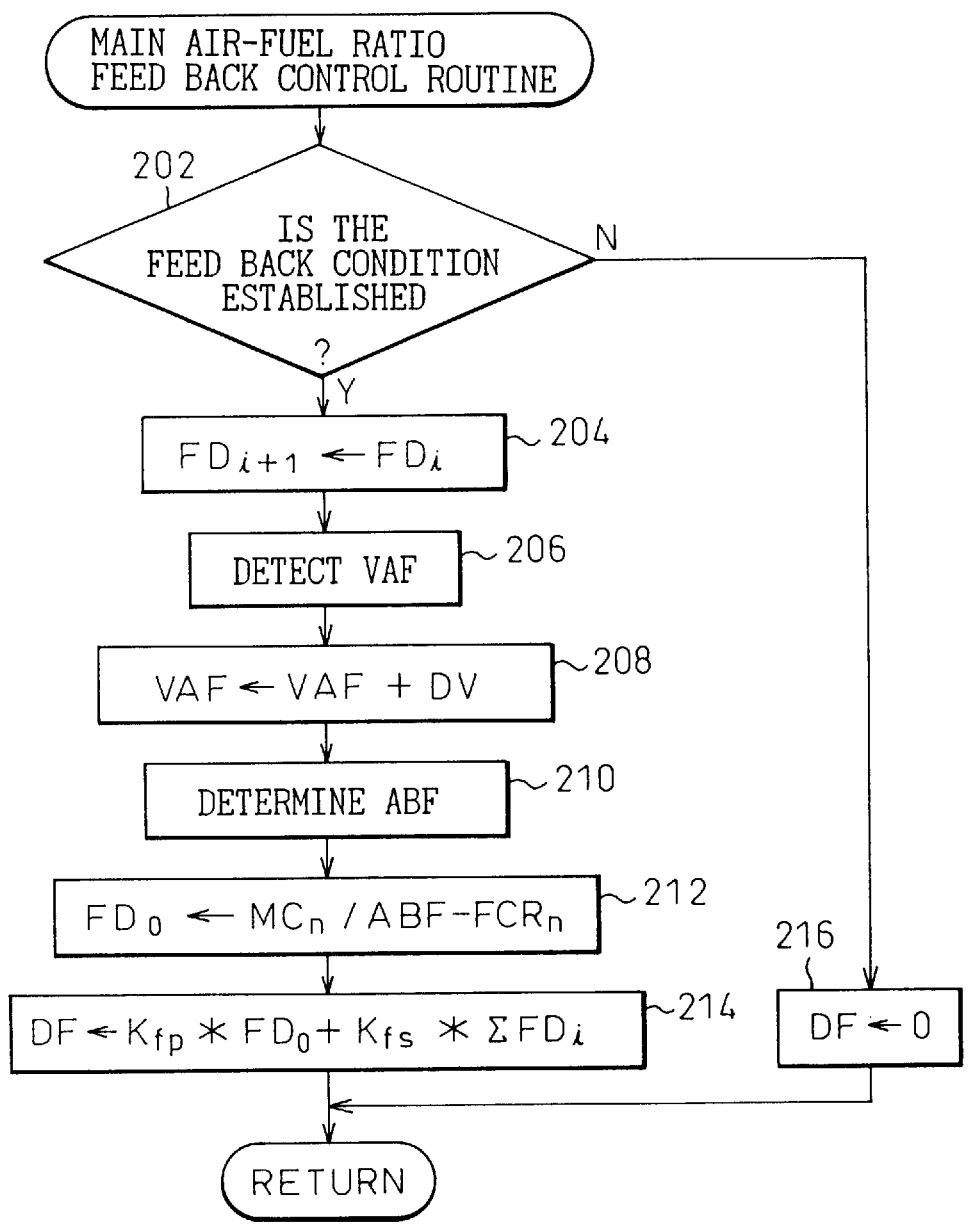
FIG. 11 is a flowchart of a main air-fuel ratio feedback control routine.

FIG. 11 is a flow chart of the main air-fuel ratio feedback control routine. This routine is executed every fixed crank angle. At first, it is determined whether or not a feedback control condition is established (step 202). For example, the feedback control condition is not established when the coolant temperature is lower than a predetermined fixed temperature, when the engine is being started, when the fuel is being increased after the engine start-up, when the fuel is being increased for warming, when the upstream A/F sensor 45 is not active, and when the fuel is being cut. Conversely, the feedback control condition is established in a state other than the above-mentioned states. When the feedback condition is not established, this routine is terminated after the fuel correction factor DF is set to zero (step 216).

When the feedback condition is established, a fuel amount difference FDi (that is, the difference between the amount of fuel actually burned in the cylinder and the target amount of fuel supplied to the cylinder) is renewed. That is, FDi is replaced with FDi+1 (step 204). This is to store FDi calculated in the previous n-th execution in RAM 74, and to calculate a new $FD_0$.

The output VAF of the upstream A/F sensor 45 is detected (step 206). The output VAF of the upstream A/F sensor 45 is corrected by adding the voltage correction factor DV calculated in the auxiliary air-fuel ratio feedback control routine (explained in detail later) to the output VAF using the following equation (step 208).

$VAF \leftarrow VAF + DV$

By this correction, the center of the fluctuation range of the output of the air-fuel ratio is gradually shifted till the output of the downstream sensor agrees with a target voltage. The present air-fuel ratio ABF is determined based on the corrected VAF using the graph of FIG. 3 (step 210). Note, this graph is stored in ROM 73.

The difference between the amount of fuel actually burned in the cylinder and the target amount of fuel supplied to the cylinder $FD_0$ is calculated using MCn and FCRn which have been calculated in the estimating routine (see FIG. 8) by the following equation (step 212).

$FD_0 \leftarrow MCn/ABF - FCRn$

The reason why MCn and FCRn are used in the above equation is to compensate for the time difference between detecting the timing of the air-fuel ratio detected by the upstream A/F sensor 45 and the actual burning timing of the mixture. That is, the reason why the amount of air in the cylinder MCi and the amount of fuel in the cylinder FCRi are stored is to compensate for the above-described time difference.

The fuel correction factor DF is determined by the proportional-integral calculation based on the following equation (step 214).

$DF \leftarrow Kfp*FD_0 + Kfs*\Sigma FDi$

The first term of the right side is the proportional term of the proportional-integral control, and Kfp is a proportional gain. The second term of the right side is the integral term of the proportional-integral control, and Kfs is an integral gain.

Figure 12:
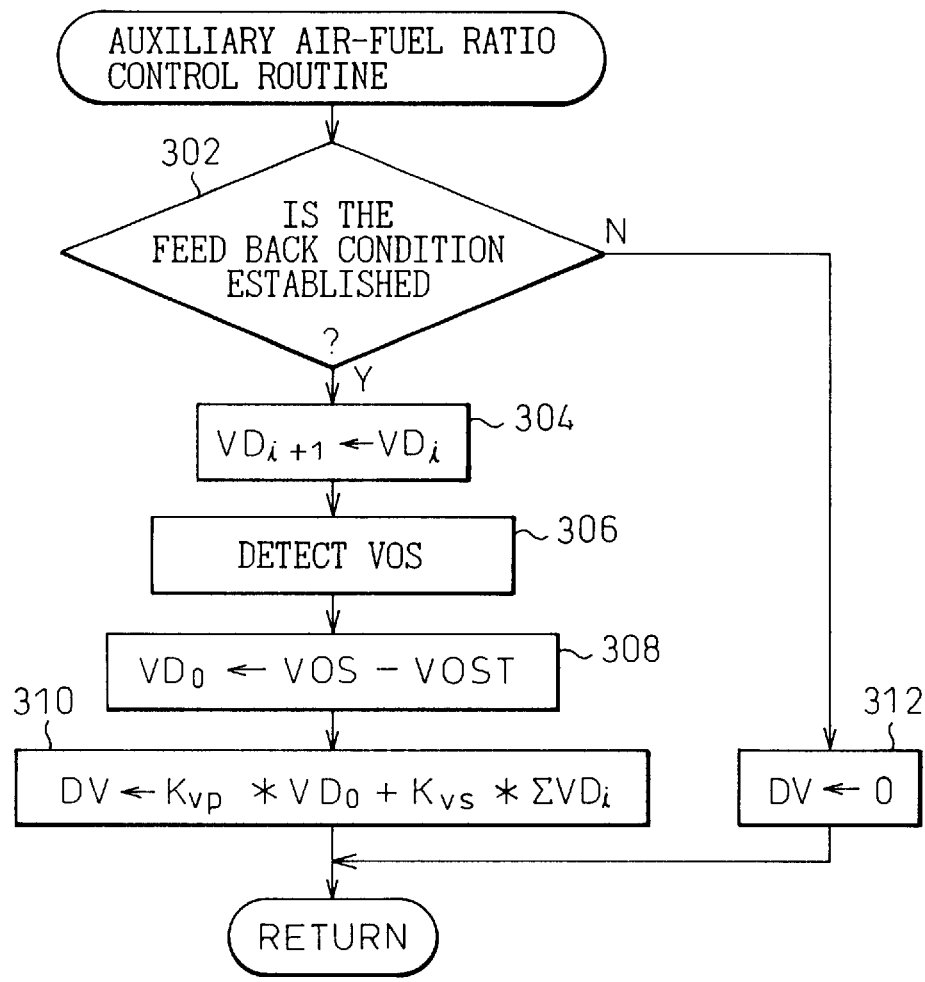
FIG. 12 is a flowchart of an auxiliary air-fuel ratio feedback control routine.

FIG. 12 is a flow chart of an auxiliary air-fuel ratio feedback control routine. This routine is executed every fixed time interval which is longer than that of the main air-fuel ratio feedback control routine. At first, it is determined whether or not a feedback control condition is established (step 302). When the condition is not established, this routine is terminated after the voltage correcting factor DV is set as zero (step 312).

When the condition is established, the voltage difference (that is, the voltage difference between the actual output voltage of the downstream $O_2$ sensor and the target voltage) VDi is renewed. That is, VDi's calculated in the previous executions are replaced with VDi+1 (step 304). This is because for storing the previous voltage differences VDi and calculating the new voltage differences $VD_0$.

The output voltage of the downstream $O_2$ sensor VOS is detected (at step 306). The new voltage differences $VD_0$ is calculated in accordance with VOS and the target voltage VOST (for example, 0.5 V) using the following equation (step 308).

$VD_0 \leftarrow VOS - VOST$

Finally, the voltage correction factor is determined by the proportional-integral calculation using the following equation (step 310).

$DV \leftarrow K_{VP}*VD_0 + K_{VS}*\Sigma VDi$

Note, $K_{VP}$ and $K_{VS}$ are a proportional gain and an integral gain respectively. The voltage correction factor DV is used for shifting the center of the main air-fuel ratio feedback control signal. Note, the $O_2$ sensor is applied as the downstream sensor in this embodiment, but an A/F sensor can also be applied as the downstream sensor.

Figure 13:
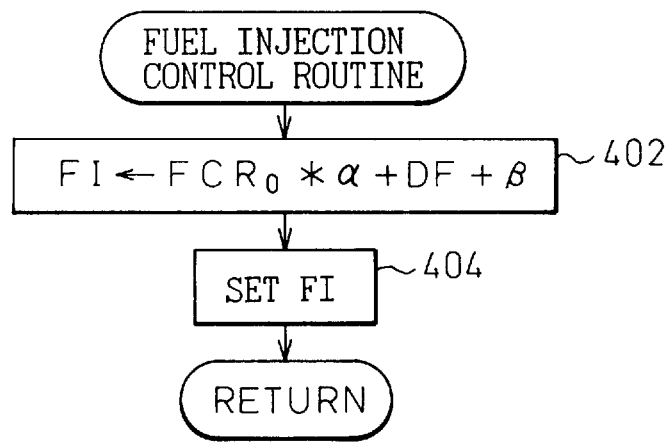
FIG. 13 is a flowchart of a fuel injection control routine.

FIG. 13 is a flow chart of a fuel injection control routine. This routine is executed every fixed crank angle. At first, the amount of injected fuel FI is calculated in accordance with the above-mentioned estimated amount of air in a cylinder, and the target amount of fuel supplied to the cylinder $FCR_0$ and the fuel correction factor FD calculated in the main air-fuel ratio feedback control routine using the following equation (step 402).

$FI \leftarrow FCR_0*\alpha + FD + \beta$

Note, $\alpha$ and $\beta$ are correction factors which are determined in accordance with other operating parameters. For example, $\alpha$ is determined in accordance with the outputs of the air temperature sensor 43, the coolant temperature sensor 44 etc., and $\beta$ is determined in accordance with amount of fuel sticking on the inner wall of the intake pipe (this varies in accordance with the intake pressure). Finally, FI is set to the drive control circuit 77a (step 404).

Figure 14:
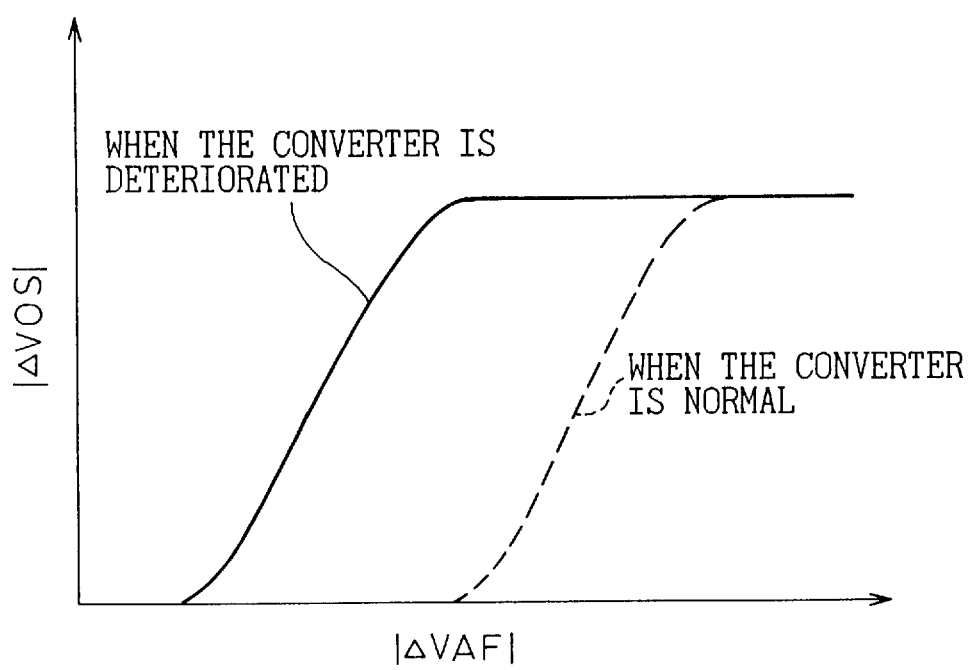
FIG. 14 is a graph to show a relationship between |ΔVAF| and |ΔVOS|.

As previously described, misjudgement may be caused when the trajectory lengths of outputs of the upstream A/F sensor and the downstream $O_2$ sensor are averaged for a monitoring period. Therefore, an apparatus according to the present invention compensates various factors which cause misjudgement. FIG. 14 is a graph to show the relationship between a deviation $\Delta$VAF of the output of the upstream A/F sensor VAF from the upstream target voltage VAFT (for example, 3.3 V) and a deviation $\Delta$VOS of the output of the downstream $O_2$ sensor VOS from the downstream target voltage VOST (for example, 0.5 V) not only when the converter is normal but also when the converter is deteriorated. As previously explained using FIG. 3, when $|\Delta$VAF$|$ is very small, $|\Delta$VOS$|$ becomes small whether or not the converter is deteriorated. Conversely, when $|\Delta$VAF$|$ is very large, $|\Delta$VOS$|$ has a constant amplitude due to Z-shape characteristic of the downstream $O_2$ sensor whether or not the converter is normal.

Figure 15:
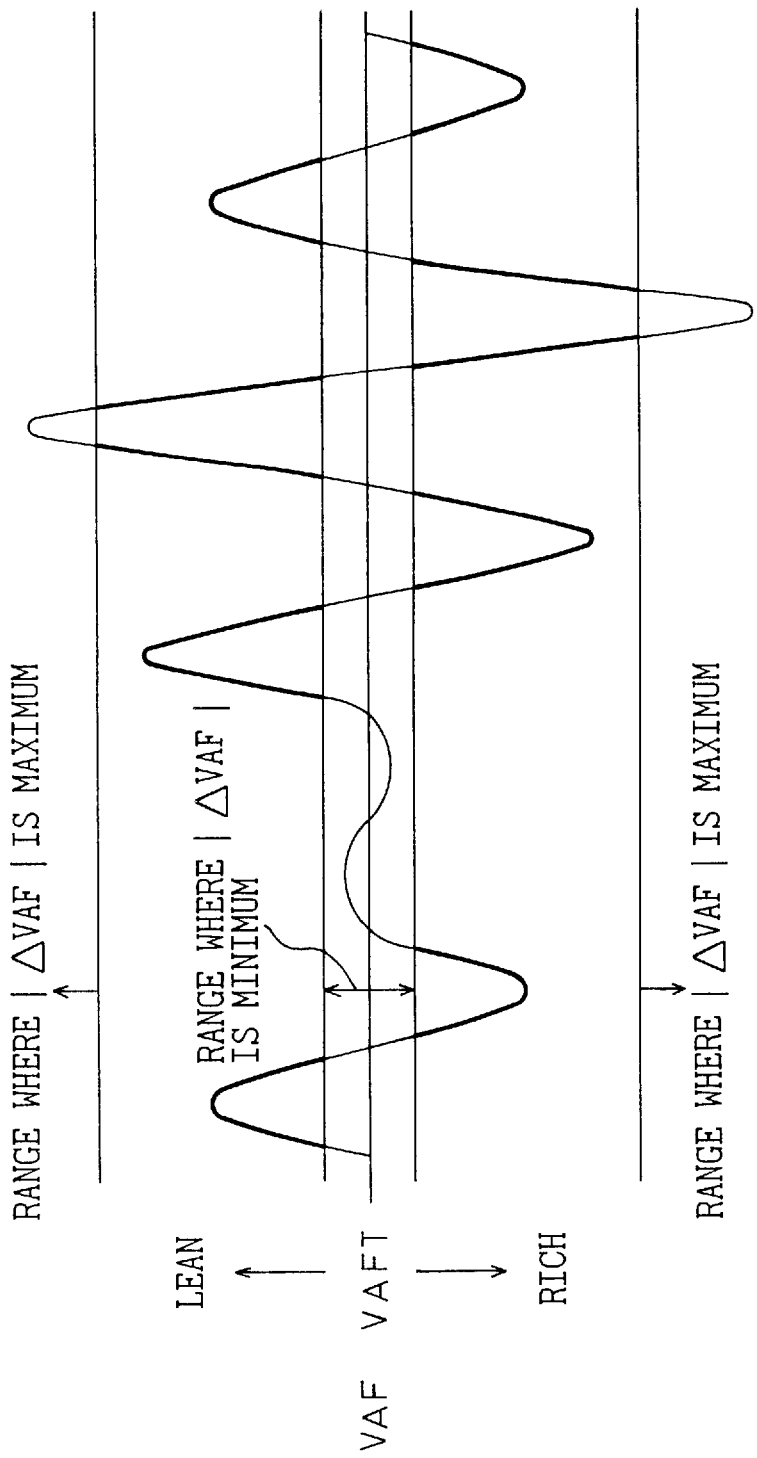
FIG. 15 is a graph to show a range for integrating the output VAF of the A/F sensor.
Figure 16:
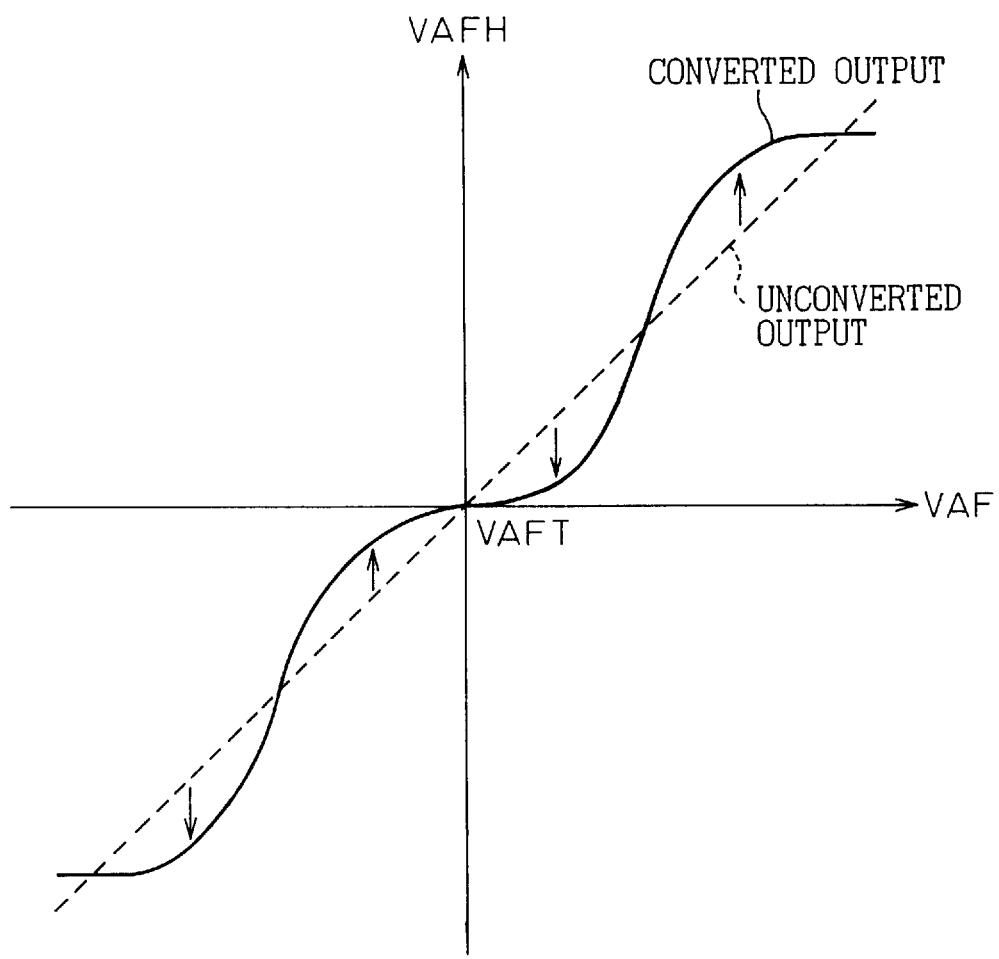
FIG. 16 is a graph to convert the output VAF of the A/F sensor into the converted output VAFH for calculating the length of the response curve of the A/F sensor.

Therefore, the trajectory length of VAF for detecting the deterioration of the converter is calculated only in cases where $\Delta$VOS, when the converter is normal, is different from that when the converter is deteriorated. That is, the trajectory length of VAF is integrated when $|\Delta$VAF$|$ is in the range (drawn by a thick line) outside the range where $|\Delta$VAF$|$ is a maximum or a minimum as shown in FIG. 15. According to the present invention, VAF is converted to VAFH using the graph shown in FIG. 16 to weight the output of the upstream A/F sensor VAF, and this VAFH is used for calculating the trajectory length. Note, the dotted line in FIG. 16 shows a value when it is not converted, that is, it is not weighted. In the other words, the converted output of the A/F sensor output VAFH can be determined uniquely in accordance with the output of the downstream $O_2$ sensor.

Figure 17:
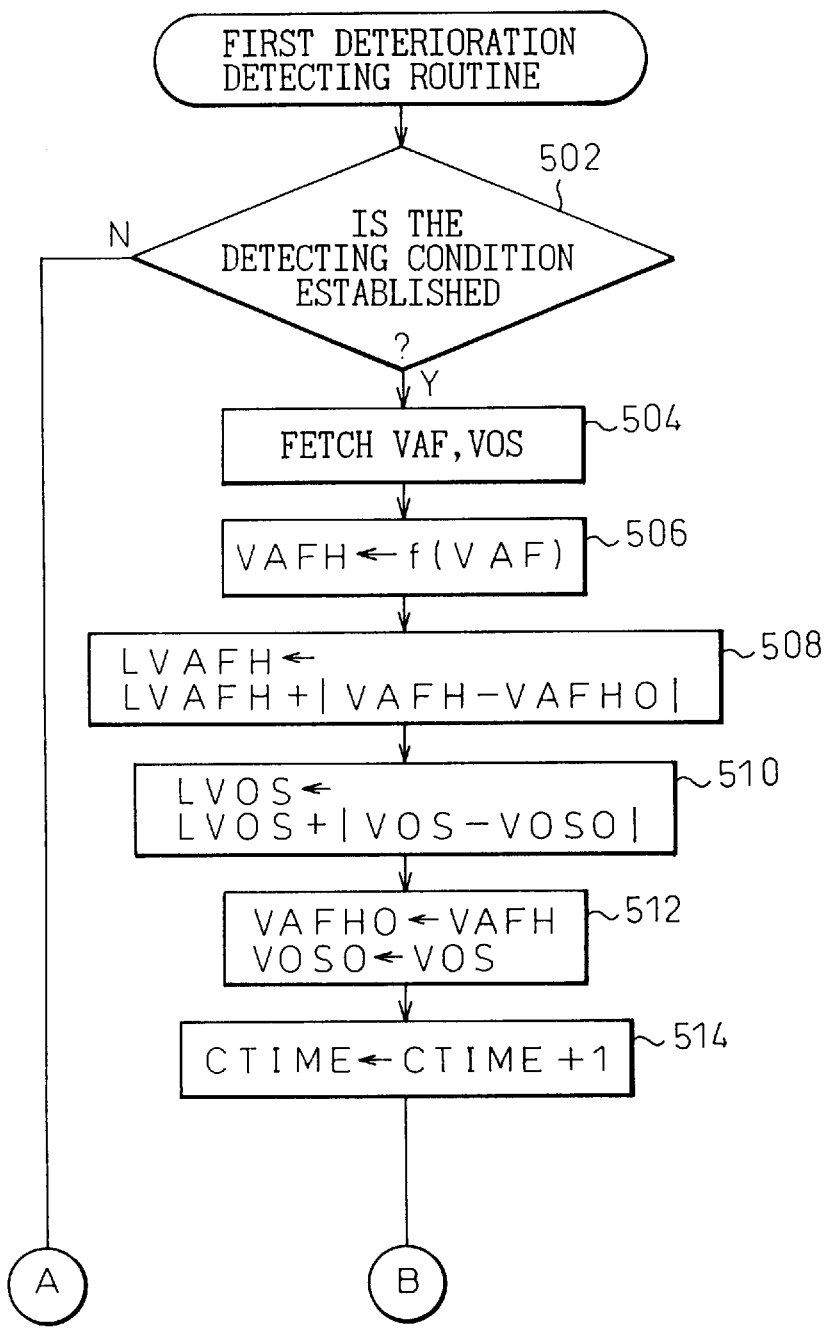
FIG. 17 is a flowchart (1/2) of a first deterioration detecting routine.
Figure 18:
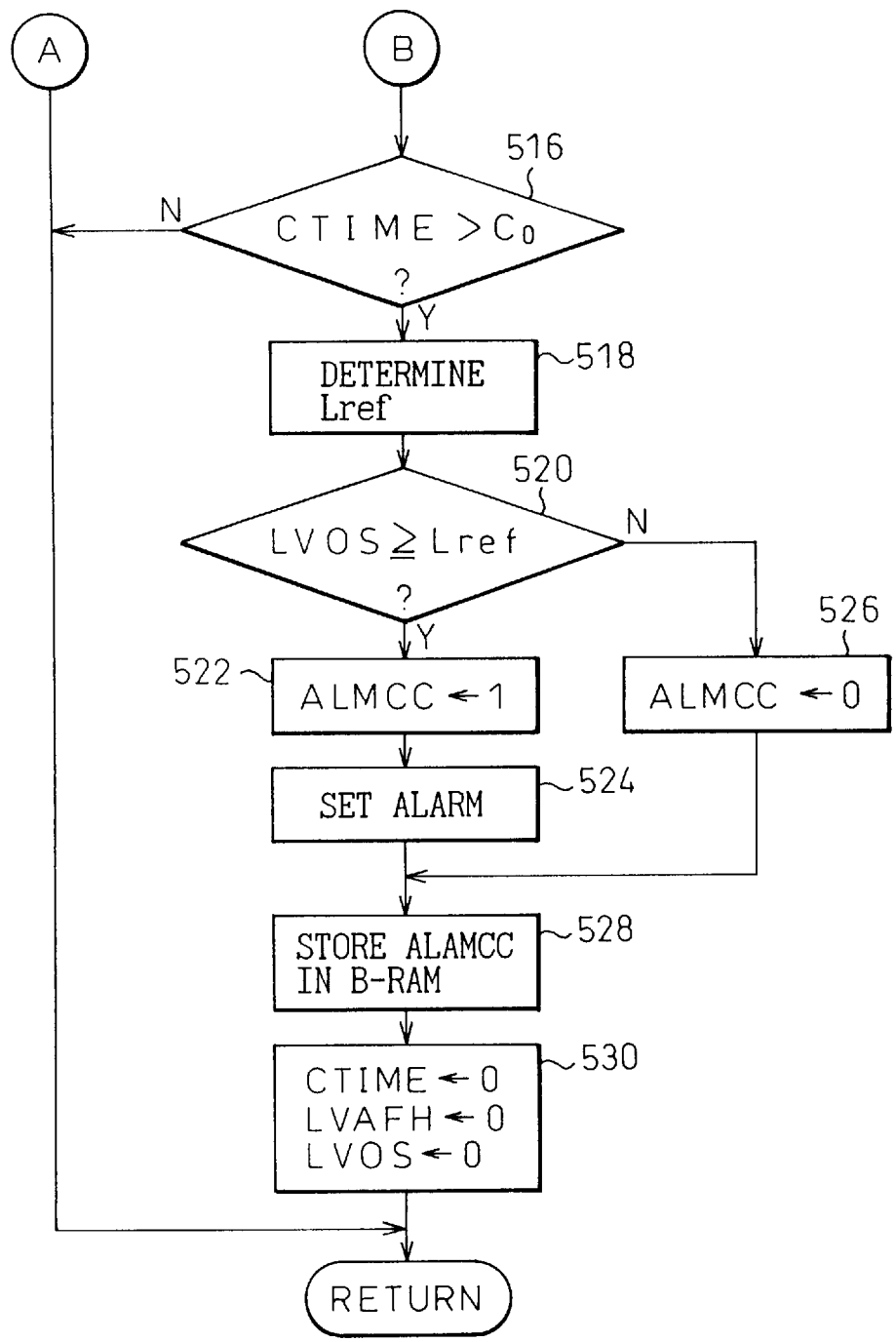
FIG. 18 is a flowchart (2/2) of a first deterioration detecting routine.

FIGS. 17 and 18 are flow charts of the first deterioration detecting routine. This routine is executed every predetermined fixed period. At first, it is determined whether or not the detecting condition for detecting the deterioration of the converter is established. This routine is terminated when this condition is not established, but the control proceeds to step 504 when this condition is established. This condition is established when the main air-fuel ratio feedback control based on the output of the A/F sensor 45 is executed, when the auxiliary air-fuel ratio feedback control based on the output of the $O_2$ sensor is executed, and when the output of the engine is larger than a fixed output.

At step 504, the output of the A/F sensor 45 VAF and the output of the $O_2$ sensor VOS are fetched. The fetched VAF is converted to the converted output for calculating the length of its response curve VAFH using the map shown in FIG. 16 at step 506. Note, this map is stored in ROM 73. The length of VAFH, that is, LVAFH is renewed using the following equation at step 508.

LVAFH←LVAFH+|VAFH−VAFHO|

The length of VOS, that is, LVOS is renewed using the following equation at step 510.

LVOS←LVOS+|VOS−VOSO|

The following processing is executed at step 512 for the next execution.

VAFHO←VAFH
VOSO←VOS

Figure 19:
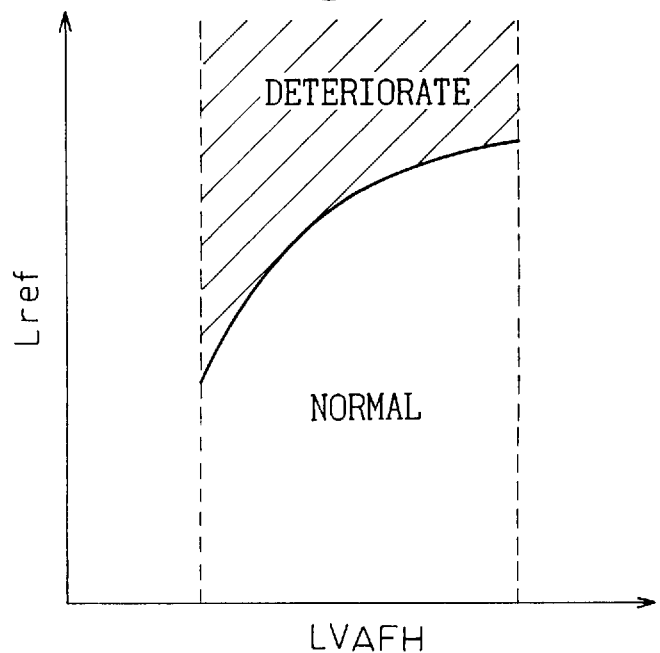
FIG. 19 is a graph to determine $L_{ref}$, that is, a threshold value for judging whether or not the converter is deteriorated.

The counter CTIME for measuring the monitoring period is incremented at step 514, and it is determined whether or not the counting value counted by CTIME is larger than a fixed value $C_0$ at step 516. The control proceeds to step 518 if CTIME>$C_0$, but the control is terminated if CTIME$\leq C_0$. The threshold for determining the deterioration Lref is determined in accordance with LVAFH using the map shown in FIG. 19 at step 518. Note, this map is stored in ROM 73. The larger LVAFH becomes, the larger Lref becomes.

It is determined whether or not the length of the response curve of the downstream $O_2$ sensor LVOS is longer than the reference Lref at step 520. If LVOS$\geq$Lref, the alarm flag ALMCC is set to "1" at step 522 and the alarm lamp 68 (FIG. 7) is lighted at step 524 because the converter is considered to have already been deteriorated. If LVOS<Lref, the alarm flag ALMCC is reset at step 526. The alarm flag ALMCC is stored in RAM 79 for maintenance at step 528. CTIME, LVAFH and LVOS are cleared for a next execution at step 530.

Figure 20:
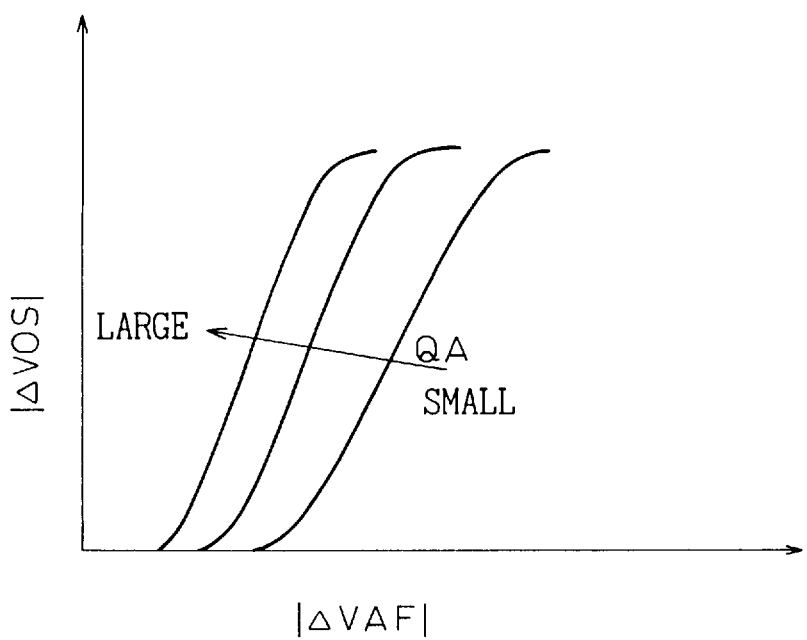
FIG. 20 is a graph to show how the relationship between $|\Delta VAF|$ and $|\Delta VOS|$ is affected by an air flow rate QA when the converter is deteriorated.
Figure 21:
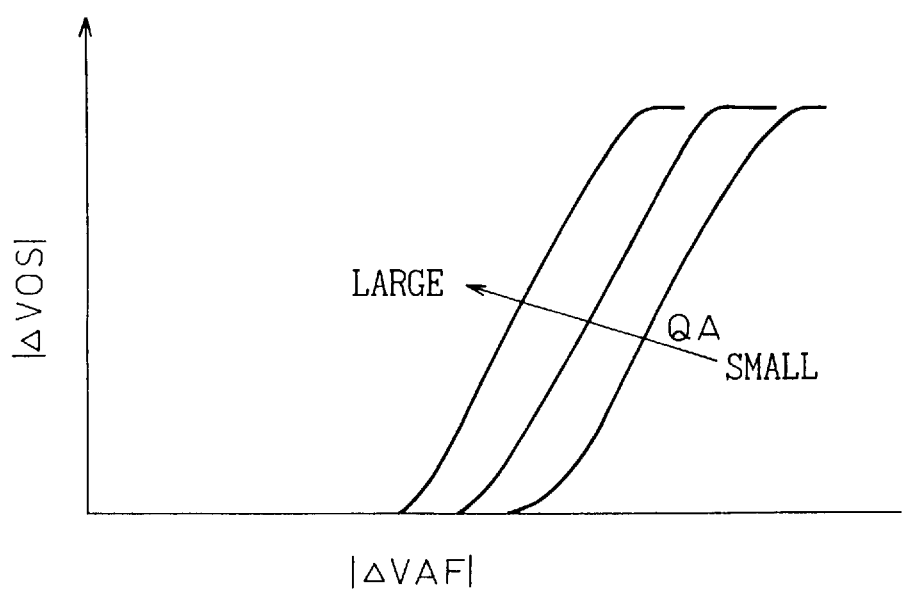
FIG. 21 is a graph to show how the relationship between $|\Delta VAF|$ and $|\Delta VOS|$ is affected by an air flow rate QA when the converter is not deteriorated.

Next, the second embodiment which is a modification of the first embodiment is explained. The map for converting the output of the A/F sensor (FIG. 16) used in the first embodiment is determined based on the relationship between $\Delta$VOS and $\Delta$VAF. This relationship, however, is influenced by the intake air flow rate QA (for example, it is given as a volume flow rate). FIG. 20 shows how this relationship is affected by the intake air flow rate QA when the converter is deteriorated, and FIG. 21 shows how this relationship is affected by the intake air flow rate QA when the converter is normal. Accordingly, in the second embodiment, a plurality of maps for converting the output of the A/F sensor will be provided as the function of the intake air flow, and an optimal map corresponding to the present air flow rate is used for calculating the trajectory length of the upstream A/F sensor.

Figure 22:
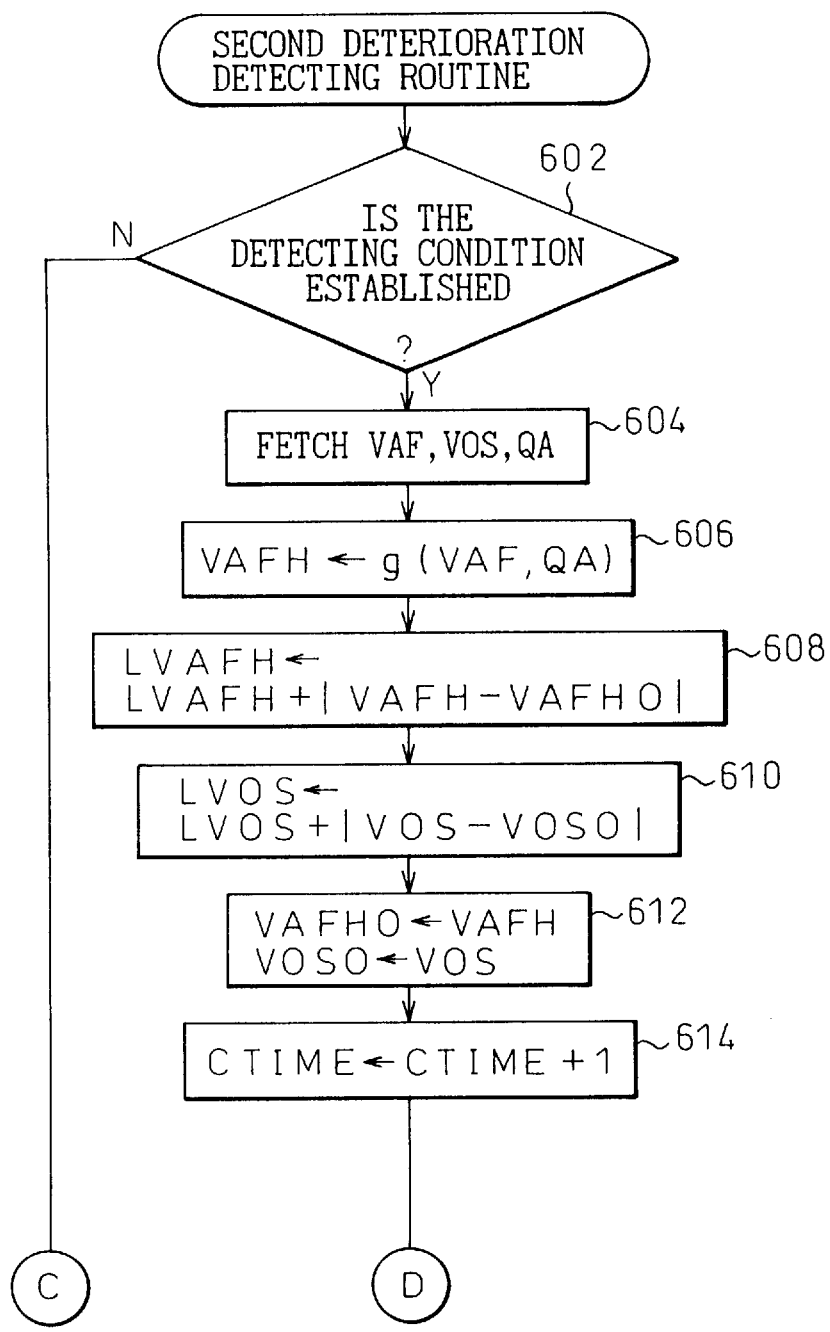
FIG. 22 is a flowchart (1/2) of a second deterioration detecting routine.
Figure 23:
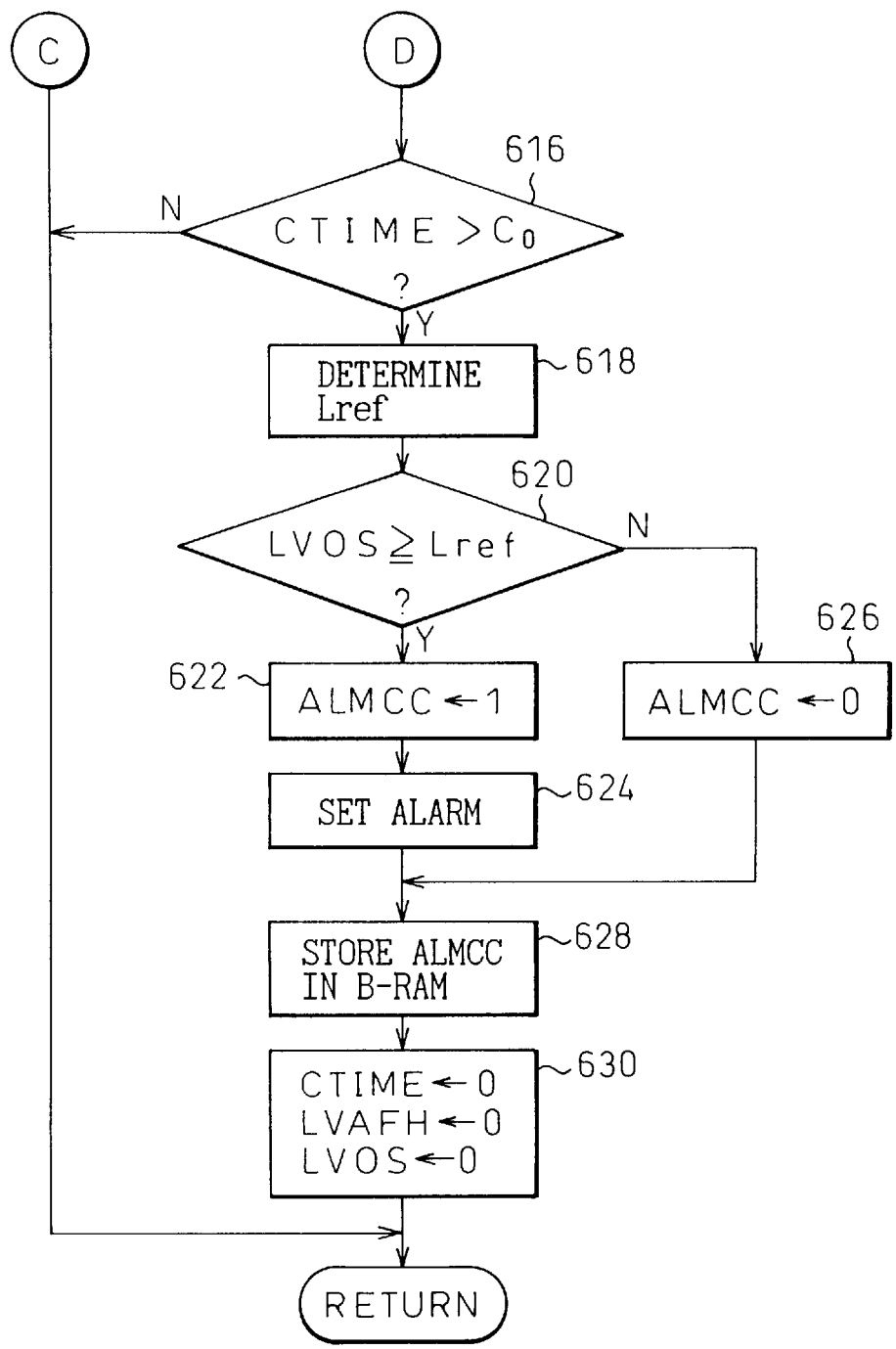
FIG. 23 is a flowchart (2/2) of a second deterioration detecting routine.

FIG. 22 and 23 are flow charts of the second deterioration detecting routine using in the second embodiment. The difference between the first deterioration detecting routine (shown in FIG. 17 and 18) and the second deterioration detecting routine exists in step 604 and 606. That is, the intake air flow rate QA is fetched in addition to the output of the A/F sensor 45 VAF and the output of the $O_2$ sensor 46 VOS at step 604. VAF is converted to the converted output for calculating the length in accordance with the present intake air flow rate QA using the map shown in FIG. 20. Other steps are same as the first embodiment.

As previously explained, the detecting accuracy is influenced by the fluctuation of the balance between the oxygen absorbing power and the oxygen releasing power of the converter. The third embodiment can maintain a high detecting accuracy even when the balance is lost.

Figure 24:
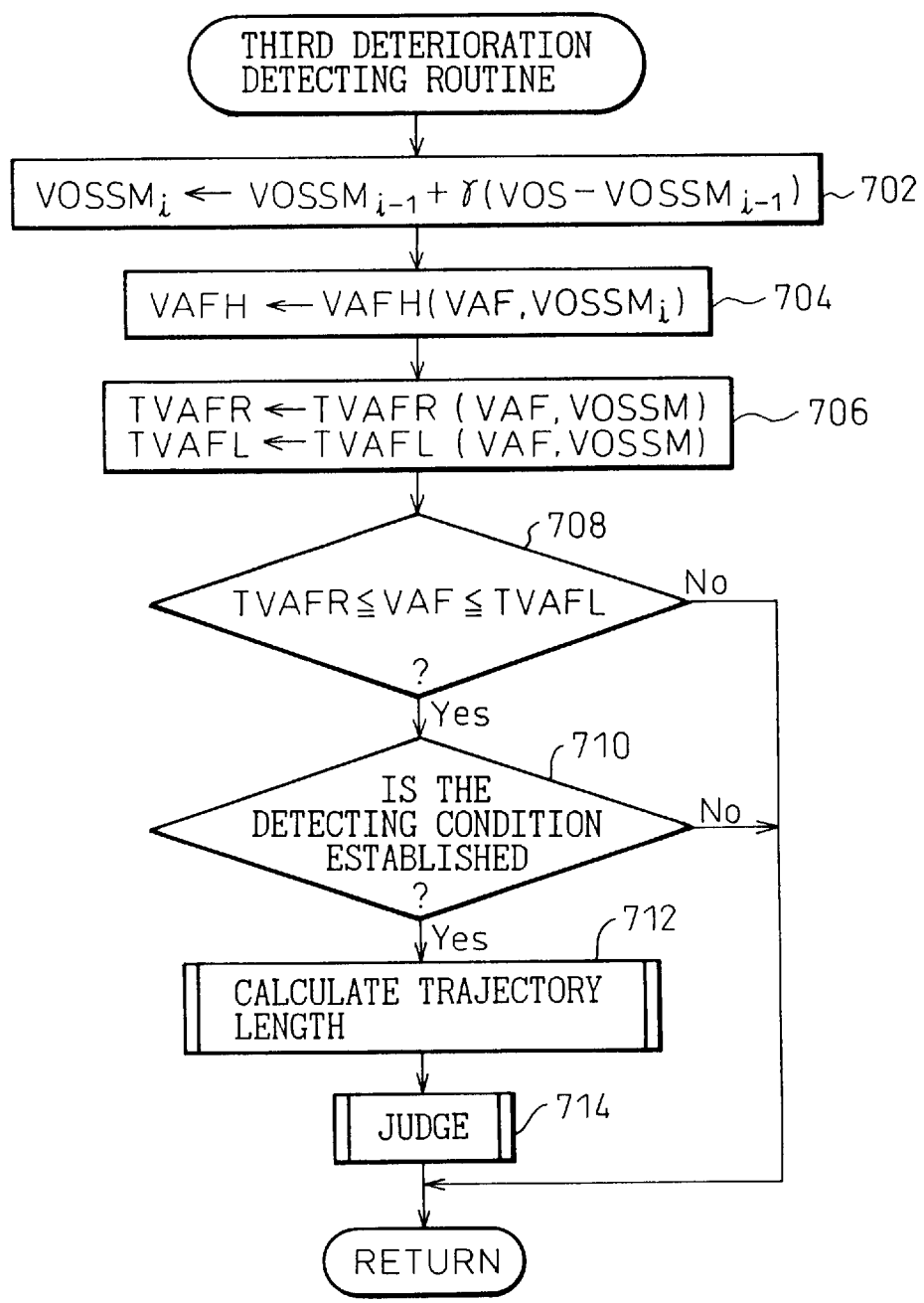
FIG. 24 is a flowchart of a main deterioration detecting routine.

FIG. 24 is a flow chart of the third deterioration detecting routine using in the third embodiment, and this routine is executed every fixed time interval.

The moving average of the output of the downstream $O_2$ sensor 46 VOSSMi is calculated using the following equation at step 702.

VOSSMi←VOSSMi−1+$\gamma$(VOS−VOSSMi−1)

where, $\gamma$ is an averaging factor,
VOSSMi−1 is the moving average previously calculated.

The converted output of the upstream A/F sensor for calculating the length VAFH is calculated as the function of the output of the upstream A/F sensor VAF and the moving average of the output of the downstream $O_2$ sensor 46 VOSSMi in order to prevent the misjudgment by ensuring a one-to-one correspondence between the length of the response curve of the upstream A/F sensor 45 and that of the downstream $O_2$ sensor 46.

Figure 25:
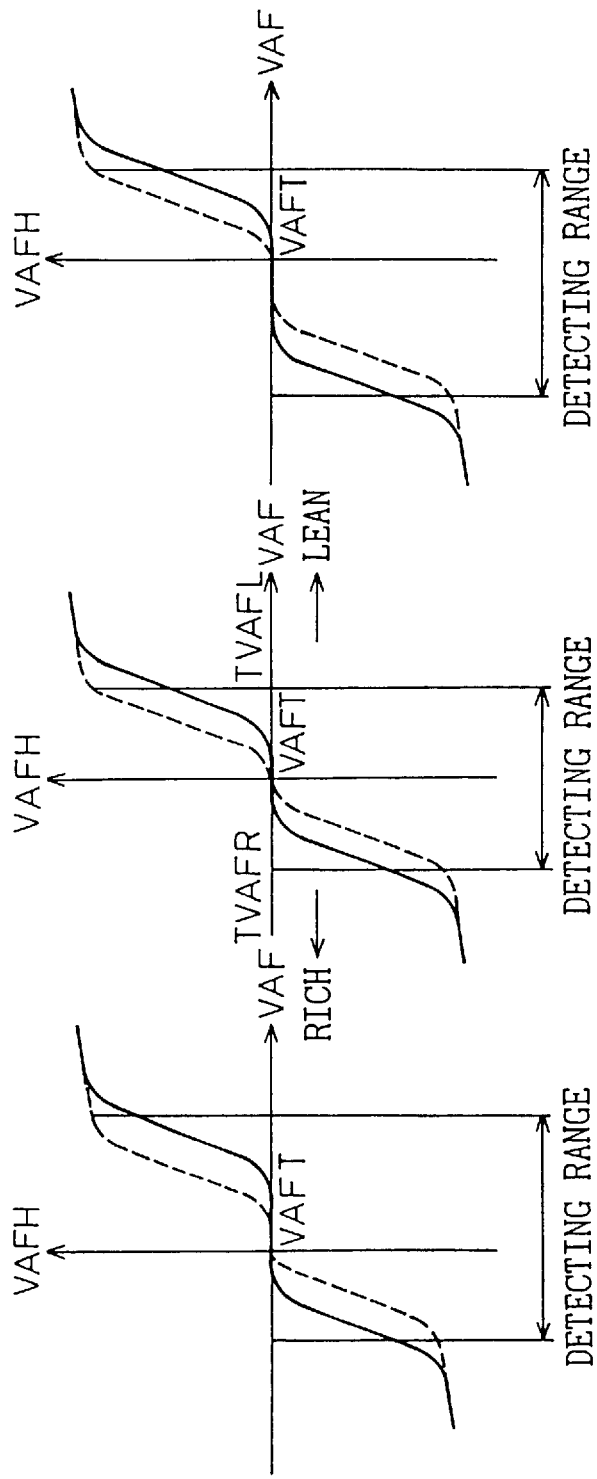
FIG. 25 (A), (B), and (C) is a first converting map.

FIG. 25 is the third converting map to calculate the original output of the upstream A/F sensor 45 into the converted output for calculating the length. The abscissa denotes the output of the upstream A/F sensor 45 VAF and the ordinate denotes the converted output for calculating the length VAFH.

That is, the output of the downstream $O_2$ sensor 46 is saturated due to the Z-shape characteristic of an $O_2$ sensor when the fluctuation of the downstream $O_2$ sensor 46 is large even if VOSSMi is the stoichiometric air-fuel ratio as shown in FIG. 25(*b*).

Therefore, the converting function (b) shown by the solid line must be used, in order to keep one to one correspondence between the length of the response curve of the output the upstream A/F sensor 45 and that of the downstream $O_2$ sensor 46.

A misjudgment, however, may occur if the function shown in FIG. 25(*b*) is used when the balance of the converter is largely shifted from the point corresponding to the stoichiometric air-fuel ratio, because the output characteristic of the $O_2$ sensor is influenced by the balance.

Therefore, the third converting function is modified by the moving average VOSSMi because the deviation from the balance point is denoted by the deviation of the moving average VOSSMi from the stoichiometric air-fuel ratio.

That is, the converting function shown by the solid line shown in FIG. 25(*a*) is used when the balance deviates to the rich state, and the converting function shown by the solid line in FIG. 25(*c*) is used when the balance deviates to the lean state.

The above describes the case when the converter is not deteriorated. Actually, the output the $O_2$ sensor is quickly saturated as shown by the dotted line in FIG. 25(*a*), (*b*) and (*c*), when the converter is deteriorated. Because the saturation of the output of the $O_2$ sensor causes the misjudgment, the deterioration of the converter is detected only in the range where the output of the A/F sensor is saturated but the converted output is not saturated.

The output of the upstream A/F sensor 45 VAF is converted to the output for calculating the length VAFH by using the map which is modified by the moving average of the $O_2$ sensor VOSSMi at step 706.

Note, the upstream A/F sensor corrected at step 208 of the main air-fuel ration feedback control routine is used for calculating the converted output VAFH when the auxiliary air-fuel ration feedback control is applied and the uncorrected output of the upstream A/F sensor is used when the auxiliary air-fuel ratio feedback control is not applied.

A lower limit TVAFL and an upper limit TVAFR for the output of the upstream A/F sensor VAF are determined as the function of the output of the upstream A/F sensor VAF and the moving average of the $O_2$ sensor 46 VOSSMi at step 706.

TVAFL=TVAFL (VAF, VOSSMi)
TVAFR=TVAFR (VAF, VOSSMi)

Note, the lower limit TVAFL and the upper limit TVAFR are determined as the terminal point of the rich side and that of the lean side respectively.

It is determined whether or not the output of the upstream A/F sensor VAF is within the lower limit TVAFL and the upper limit TVAFR at step 708.

When the output of the upstream A/F sensor VAF is within the lower limit TVAFL and the upper limit TVAFR, the control proceeds to step 710 to detect the deterioration of the converter because the misjudgment never occur. Conversely, when VAF is not within the lower limit TVAFL and the upper limit TVAFR, the control is directly terminated to avoid the misjudgment.

It is determined whether or not detecting condition for detecting the deterioration of the converter is established at step 710. Note this condition is established when all following conditions are established.

(1) The main air-fuel ratio feedback control based on the output of the upstream A/F sensor is executing.
(2) The auxiliary air-fuel ratio feedback control based on the output of the downstream $O_2$ sensor is executing.
(3) The output of the engine is higher than a predetermined fixed output.

Therefore, when any one of the above conditions is not established, the control is directly terminated without detecting the deterioration.

Conversely, when all of the above conditions are established, the control is terminated after executing the length calculating routine at step 712 and the judging routine at step 714. Note, the length calculating routine and the judging routine will be explained later.

Figure 26:
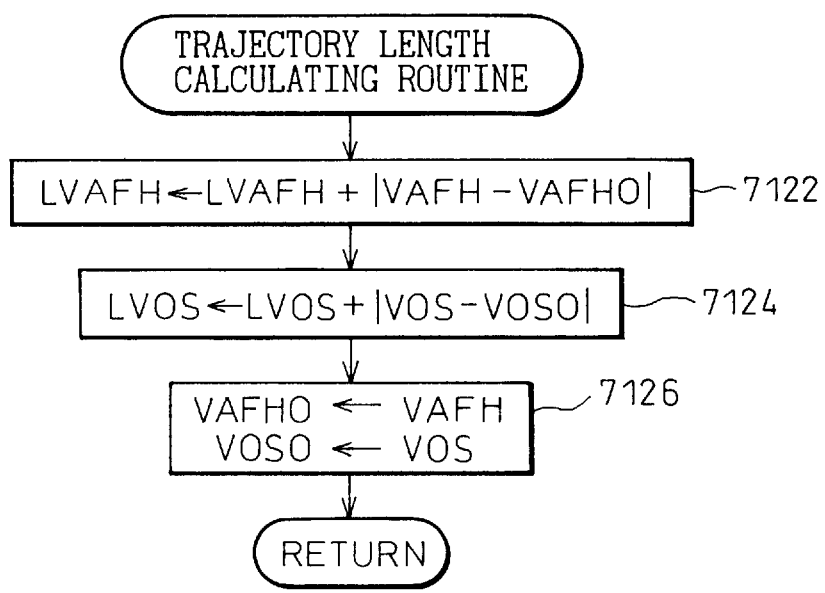
FIG. 26 is a length calculating routine.

FIG. 26 is a flow chart of the length calculating routine executed at step 712, and the length of the response curve of the output of the upstream A/F sensor 45 LVAFH is calculated based on the converted output VAFH by using the following equation at step 7122.

LVAFH←LVAFH+|VAFH−FAFHO|

Where VAFHO is the output calculated at the previous execution.

The length of the response curve of the output of the downstream $O_2$ sensor is calculated by using the following equation at step 7124.

LVOS←LVOS+|VOS−VOSO|

Where VOSO is the output at the previous execution.

Then the control is terminated after replacing the present converted output of the upstream A/F sensor 45 VAFH and the present output of the downstream $O_2$ sensor 46 VOS with VAFHO and VOSO respectively at step 7126.

Figure 27:
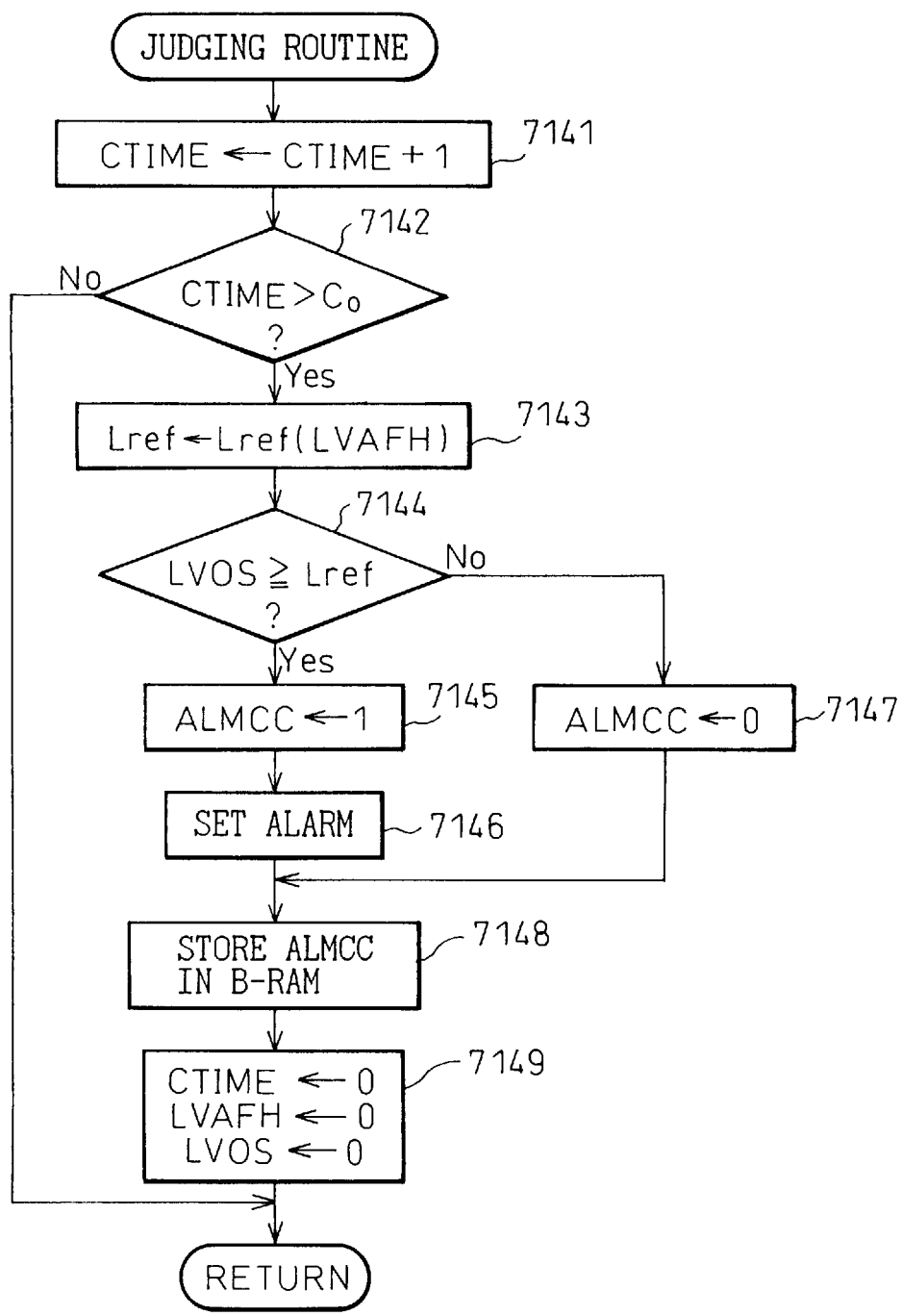
FIG. 27 is a deterioration detecting routine.

FIG. 27 is a flow chart of the judging routine executed at step 714. The counter CTIME for measuring the monitoring period is incremented at step 7141, and it is determined whether or not CTIME is larger than a fixed value $C_0$ at step 7142.

The control proceeds to step 7143–7149 when the fixed monitoring period has elapsed.

The threshold for determining the deterioration Lref is determined in accordance with LVAFH at step 7143.

Lref←Lref (LVAFH)

It is determined whether or not the length of the response curve of the $O_2$ sensor LVOS is longer than the threshold Lref, that is, whether or not the converter has been deteriorated at step 7143.

When it is determined that the converter has deteriorated, the control proceeds to step 7148 after the alarm flag ALMCC is set to 1 at step 7145 and the alarm lamp 68 (FIG. 7) is lighted at step 7146.

Conversely, when it is determined that he converter has not been deteriorated, the control proceeds to step 7148 after the alarm flag ALMCC is reset at step 7147. The alarm flag ALMCC is stored in B-RAM 79 for maintenance at step 7148.

The control is terminated after CTIME, LVAFH and LVOS are cleared for next the execution at step 7149.

Note, when the monitoring period has not elapsed, the control is directly terminated.

In the third embodiment, an air-fuel ratio sensor arranged at the downstream of the converter is the $O_2$ sensor, but according to the present invention a linear sensor (A/F sensor) can be applied as the downstream of the convertor.

Because the process for detecting the deterioration is almost same as the third embodiment, only the different points will be explained.

FIG. 28 is a graph of when an A/F sensor is applied as the downstream sensor. In the upper graph, the ordinate denotes the output of the upstream sensor VAF (solid line) and the output for calculating the length (dotted line) respectively. In the lower graph, the ordinate denotes the output of the downstream sensor VAFR (solid line) and its moving average VAFRSM (dotted line) respectively. In both graphs, the abscissa denotes time.

Because the moving average of the output of the downstream A/F sensor VAFRSM is the rich state before time $t_i$, it is directly influenced by lean spikes of the air-fuel ratio of the exhaust gas supplied to the converter, but is never influenced by small rich spikes.

After the moving average of the output of the downstream A/F sensor VAFRSM becomes the stoichiometric air-fuel ratio at time $t_1$, it is influenced by not only lean spikes but also rich spikes.

After the moving average of the output of the downstream A/F sensor VAFRSM becomes the lean state at time $t_2$, it is directly influenced by rich spikes, but is not influenced by small lean spikes.

Therefore, the converting function must be determined so that the above mentioned characteristic is compensated for.

FIG. 29 shows the fourth converting function using in the fourth embodiment. The abscissa denotes the output of the upstream A/F sensor VAF, and the ordinate denotes the converted output for calculating the trajectory length VAFH.

That is, when the moving average of the output of the downstream A/F sensor VAFRSM is the stoichiometric air-fuel ratio as shown in FIG. 29(b), the converted output VAFH is roughly proportional to the output of the upstream A/F sensor VAF.

When the moving average of the output of the downstream A/F sensor VAFRSM is rich the converted output corresponding to the small shift to the rich side is set to zero as shown in FIG. 29(a). Conversely, when VAFRSM is lean, the converted output corresponding to the small shift to the lean side is set to zero as shown in FIG. 29(c).

Therefore, in the fourth embodiment, the converted output must be calculated using the converting function shown in FIG. 29.

Further, step 706 and 708 of the third deterioration detecting routine (FIG. 24) is not required because the misjudgment never occurs when a linear sensor is applied as the downstream sensor.

I claim:

1. An apparatus for detecting deterioration of a three-way catalytic converter disposed in an exhaust passage of an internal combustion engine comprising:

an upstream air-fuel ratio sensor disposed in the exhaust passage at the upstream side of said catalytic converter for outputting a signal substantially proportional to the air-fuel ratio of the exhaust gas at the upstream side of said catalytic converter;

a downstream air-fuel sensor disposed in the exhaust passage at the downstream side of said catalytic converter for outputting a signal corresponding to the air-fuel ratio of the exhaust gas at the downstream side of said catalytic converter;

an air-fuel ratio feedback control means for controlling the air-fuel ratio of the engine to a target air-fuel ratio in accordance with at least the output of said upstream air-fuel ratio sensor;

an output converting means for converting the output of said upstream air-fuel ratio sensor into the converted output in accordance with a relationship between the difference between the output of said upstream air-fuel ratio sensor and the target air-fuel ratio and the difference between the output of said downstream air-fuel sensor and the target air-fuel ratio;

a length calculating means for calculating a length of the response curve of the converted output of said upstream air-fuel ratio sensor converted by said output converting means and a length of the response curve of said downstream air-fuel ratio sensor when the engine is controlled by said air-fuel ratio feedback control means; and a deterioration detecting means for detecting a deterioration of said catalytic converter in accordance with the upstream length and the downstream length calculated by said length calculating means.

2. An apparatus for detecting deterioration of a three-way catalytic converter for an engine of claim 1, further comprising an intake air flow rate measuring means for measuring an intake air flow rate supplied to the engine; wherein said output converting means has a converting characteristic changing means for changing the converting characteristic in accordance with the intake air flow rate measured by said intake air flow rate measuring means.

3. An apparatus for detecting deterioration of a three-way catalytic converter for an engine of claim 1, wherein said deterioration detecting means detects the deterioration of the converter by comparing the downstream length calculated by said length calculating means with a reference value determined in accordance with the converted output converted by said output converting means.

4. An apparatus for detecting deterioration of a three-way catalytic converter disposed in an exhaust passage of an internal combustion engine comprising:

an upstream air-fuel ratio sensor disposed in the exhaust passage at the upstream side of said catalytic converter for outputting a signal substantially proportional to the air-fuel ratio of the exhaust gas at the upstream side of said catalytic converter;

a downstream air-fuel sensor disposed in the exhaust passage at the downstream side of said catalytic converter for outputting a signal corresponding to the air-fuel ratio of the exhaust gas at the downstream side of said catalytic converter;

an air-fuel ratio feedback control means for controlling the air-fuel ratio of the engine to a target air-fuel ratio in accordance with at least the output of said upstream air-fuel ratio sensor;

an air-fuel ratio center estimating means for estimating a center of the air-fuel ratio of said catalytic converter;

an output converting means for converting the output of said upstream air-fuel ratio sensor into the converted output in accordance with a relationship between the difference between the output of said upstream air-fuel ratio sensor and the target air-fuel ratio and the center estimated by said air-fuel ratio center estimating means;

a length calculating means for calculating a length of the response curve of the converted output of said upstream air-fuel ratio sensor converted by said output converting means and a length of the response curve of said downstream air-fuel ratio sensor when the engine is controlled by said air-fuel ratio feedback control means; and a deterioration detecting means for detecting a deterioration degree of said catalytic converter in accordance with the upstream length and the downstream length calculated by said length calculating means.

5. An apparatus for detecting deterioration of a three-way catalytic converter for an engine of claim 4, wherein said air-fuel ratio center estimating means estimates a center based on a moving average of the output of said downstream air-fuel ratio sensor.

6. An apparatus for detecting deterioration of a three-way catalytic converter for an engine of claim 5, wherein said downstream air-fuel ratio sensor is an $O_2$ sensor; and further comprising:

a limit value determining means for determining an upper limit and a lower limit in accordance with the center of the air-fuel ratio estimated by said air-fuel ratio center estimating means; and a detection inhibiting means for inhibiting detecting the deterioration of said catalytic converter when the output of said upstream air-fuel ratio sensor departs from the range between the upper limit and the lower limit determined by said limit value determining means.

7. A method for detecting deterioration of a three-way catalytic converter disposed in an exhaust passage of an internal combustion engine which provides an upstream air-fuel ratio sensor disposed in the exhaust passage at the upstream side of said catalytic converter for outputting a signal substantially proportional to an air-fuel ratio of the exhaust gas at the upstream side of said catalytic converter, and a downstream air-fuel ratio sensor disposed in the exhaust passage at the downstream side of said catalytic converter for outputting a signal corresponding to an air-fuel ratio the exhaust gas at the downstream side of said catalytic converter comprising steps of:

an air-fuel ratio feedback control step for controlling the air-fuel ratio of the engine to a target air-fuel ratio in accordance with at least the output of said upstream air-fuel ratio sensor;

an output converting step for converting the output of said upstream air-fuel ratio sensor into the converted output in accordance with a relationship between the difference between the output of said upstream air-fuel ratio sensor and the target air-fuel ratio and the difference between the output of said downstream air-fuel sensor and the target air-fuel ratio;

a length calculating step for calculating a length of the response curve of the converted output of said upstream air-fuel ratio sensor converted at said output converting step and a length of the response curve of said downstream air-fuel ratio sensor when the engine is controlled at said air-fuel ratio feedback control step; and a determination detecting step for detecting a deterioration of said catalytic converter in accordance with the upstream length and the downstream length calculated at said length calculating step.

8. A method for detecting deterioration of a three-way catalytic converter for an engine of claim 7, wherein:

further comprising an intake air flow rate measuring step for measuring an intake air flow rate supplied to the engine;

said output converting step has a converting characteristic changing means for changing the converting characteristic in accordance with the intake air flow rate measured by said intake air flow rate measuring step.

9. A method for detecting deterioration of a three-way catalytic converter for an engine of claim 7, wherein said deterioration detecting step detects the deterioration of said catalytic converter by comparing the downstream length calculated at said length calculating step with a reference value determined in accordance with the converted output converted in said output converting step.

10. A method for detecting deterioration of a three-way catalytic converter disposed in an exhaust passage of an internal combustion engine which provides an upstream air-fuel ratio sensor disposed in the exhaust passage at the upstream side of said catalytic converter for outputting a signal substantially proportional to an air-fuel ratio of the exhaust gas at the upstream side of said catalytic converter, and a downstream air-fuel ratio sensor disposed in the exhaust passage at the downstream side of said catalytic converter for outputting a signal corresponding to an air-fuel ratio the exhaust gas at the downstream side of said catalytic converter comprising steps of:

an air-fuel ratio feedback control step for controlling the air-fuel ratio of the engine at a target air-fuel ratio in accordance with at least the output of said upstream air-fuel ratio sensor;

an air-fuel ratio center estimating step for estimating a center of the air-fuel ratio of said catalytic converter;

an output converting step for converting the output of said upstream air-fuel ratio sensor into the converted output in accordance with a relationship between the difference between the output of said upstream air-fuel ratio sensor and the target air-fuel ratio and the center estimated in said air-fuel ratio center estimating step;

a length calculating step for calculating a length of the response curve of the converted output of said upstream air-fuel ratio sensor converted at said output converting step and a length of the response curve of said downstream air-fuel ratio sensor when the engine is controlled at said air-fuel ratio feedback control step; and a deterioration detecting step for detecting a deterioration degree of said catalytic converter in accordance with the upstream length and the downstream length calculated at said length calculating step.

11. A method for detecting deterioration of a three-way catalytic converter for an engine of claim 10, wherein said air-fuel ratio center estimating step estimates a center based on a moving average of the output of said downstream air-fuel ratio sensor.

12. A method of claim 11 for detecting deterioration of a three-way catalytic converter for an engine which provides an $O_2$ sensor as said downstream air-fuel ratio sensor, further comprising the steps of:

a limit value determining step for determining an upper limit and a lower limit in accordance with the center of the air-fuel ratio estimated in said air-fuel ratio center estimating step; and a detection inhibiting step for inhibiting detecting the deterioration of said catalytic converter when the output of said upstream air-fuel ratio sensor departs from the range between the upper limit and the lower limit determined in said limit value determining step.

* * * * *